United States Patent
Tanno et al.

(10) Patent No.: US 12,123,517 B2
(45) Date of Patent: Oct. 22, 2024

(54) VALVE, ABNORMALITY DIAGNOSIS METHOD OF VALVE

(71) Applicant: Fujikin Incorporated, Osaka (JP)

(72) Inventors: Ryutaro Tanno, Osaka (JP); Kenji Aikawa, Osaka (JP); Akihiro Harada, Osaka (JP); Yuya Suzuki, Osaka (JP); Takahiro Matsuda, Osaka (JP); Katsunori Komehana, Osaka (JP); Masahiko Ochiishi, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 18/136,844

(22) Filed: Apr. 19, 2023

(65) Prior Publication Data

US 2023/0258281 A1    Aug. 17, 2023

Related U.S. Application Data

(63) Continuation of application No. 16/765,863, filed as application No. PCT/JP2018/037417 on Oct. 5, 2018, now abandoned.

(30) Foreign Application Priority Data

Nov. 29, 2017   (JP) ................. 2017-229482

(51) Int. Cl.
*F16K 37/00*    (2006.01)
*F16K 7/16*    (2006.01)
(Continued)

(52) U.S. Cl.
CPC ............ *F16K 37/0033* (2013.01); *F16K 7/16* (2013.01); *F16K 31/046* (2013.01);
(Continued)

(58) Field of Classification Search
CPC .... F16K 31/5286; F16K 31/508; F16K 31/04; F16K 31/046; F16K 31/047; F16K 37/0033; F16K 7/16; F16K 37/0041
See application file for complete search history.

(56) References Cited

U.S. PATENT DOCUMENTS 4,523,286 A * 6/1985 Koga ................. F16K 37/0083
                                                    700/289
6,220,284 B1   4/2001 Hayashi et al.
(Continued)

FOREIGN PATENT DOCUMENTS

CN          1280262 A    1/2001
CN          204729718 U   10/2015
(Continued)

*Primary Examiner* — Atif H Chaudry
(74) *Attorney, Agent, or Firm* — WC&F IP

(57) ABSTRACT

To enable accurate and simple diagnosis of an operation abnormality of a valve.
A valve V1 capable of detecting an operation abnormality has a magnet M1 that is attached in the vicinity of a pressing adapter 52 of a stem 53 that slides according to an opening/closing operation of the valve V1, and a magnetic sensor M2 that is attached to a surface acing the stem 53, inside the pressing adapter 52 that presses a peripheral edge of a diaphragm 51, and detects a change in a distance between the magnet M1 and the magnetic sensor M2. Further, an abnormality determination mechanism compares the change in the distance between the magnet M1 and the magnetic sensor M2 at the time of abnormality diagnosis detected by the magnetic sensor M2 and a previously measured change in the distance between the magnet M and the magnetic sensor M2 at the time of normality, and determines whether or not there is an abnormality.

3 Claims, 18 Drawing Sheets

(51) Int. Cl.
*F16K 31/04* (2006.01)
*F16K 31/50* (2006.01)
*F16K 31/528* (2006.01)
*G01M 13/003* (2019.01)

(52) U.S. Cl.
CPC .......... *F16K 31/047* (2013.01); *F16K 31/508* (2013.01); *F16K 31/5286* (2013.01); *F16K 37/0041* (2013.01); *G01M 13/003* (2019.01)

(56) References Cited

U.S. PATENT DOCUMENTS

| | | |
|---|---|---|
| 6,302,130 B1 | 10/2001 | Ohmi et al. |
| 6,321,781 B1 | 11/2001 | Kurth |
| 2008/0202606 A1 | 8/2008 | O'Hara |
| 2010/0090151 A1 | 4/2010 | Tanikawa et al. |
| 2010/0155641 A1 | 6/2010 | Masamura |

FOREIGN PATENT DOCUMENTS

| | | | | |
|---|---|---|---|---|
| EP | 0947901 A2 | 6/1999 | | |
| EP | 2202496 A2 * | 6/2010 | ......... | F16K 37/0041 |
| JP | S63-173577 U | 11/1988 | | |
| JP | 1999315955 A | 11/1999 | | |
| JP | 3546153 B | 7/2004 | | |
| JP | 2007064333 A | 3/2007 | | |
| JP | 2007078143 A | 3/2007 | | |
| JP | 2008208977 A | 9/2008 | | |
| JP | 2010519488 A | 6/2010 | | |
| JP | 2010144874 A | 7/2010 | | |
| JP | 2016-223533 A | 12/2016 | | |
| KR | 20060133770 A * | 12/2006 | | |

* cited by examiner (a)

(b)

(a)

(b)

VALVE, ABNORMALITY DIAGNOSIS METHOD OF VALVE

CROSS-REFERENCE

This application is a continuation of U.S. application Ser. No. 16/765,863 filed on May 20, 2020, which is a national phase of an international application, PCT/JP2018/037417 filed on Oct. 5, 2018, which claims the benefit of Japanese Application No. 2017-229482, filed on Nov. 29, 2017.

TECHNICAL FIELD

The present invention relates to a valve capable of diagnosing an abnormality and a method for diagnosing an abnormality of the valve.

BACKGROUND ART

A fluid control device such as an automatic valve is used in a fluid supply line that supplies a process fluid used in a semiconductor manufacturing process.

In recent years, a semiconductor manufacturing process such as atomic layer deposition (ALD) is advanced and complicated, and the number of fluid control devices mounted on a gas unit increases. Further, with the advancement of the fluid control device, wiring around the fluid control device, such as electric wiring and an air tube for supplying a drive pressure, is complicated.

In this regard, Patent Literature 1 proposes a valve that includes a body provided with a first flow passage and a second flow passage and a valve element causing the first flow passage and the second flow passage to communicate with or block each other. The body has a base portion that has a first plane located at the side of the valve element and a second plane located at the side opposite to the first plane, a first connection portion that has a third plane forming a step portion with the second plane, and a second connection portion that has a fourth plane forming a step portion with the first plane. The first flow passage has a 1-1 flow passage and a 1-2 flow passage. A 1-1 port of the 1-1 flow passage is opened to the third plane, a 1-3 port of the 1-2 flow passage communicates with a 1-2 port of the 1-1 flow passage and is opened to the valve element, a 1-4 port of the 1-2 flow passage is opened to the fourth plane, and the first flow passage and the second flow passage can communicate with each other via the 1-3 port. The first connection portion is connected to a portion corresponding to the second connection portion in a body of another valve, and the 1-1 flow passage and a flow passage corresponding to the 1-2 flow passage in the body of another valve communicate with each other.

Further, as technology for diagnosing an abnormality of the valve, Patent Literature 2 proposes an orifice clogging detection method in a pressure type flow rate control device. The flow rate control device includes a control valve, an orifice, a pressure detector for detecting an upstream side pressure between them, and a flow rate setting circuit. The flow rate control device holds the upstream side pressure at about twice or more a downstream side pressure, calculates a flow rate of the downstream side, and controls opening/closing of the control valve, on the basis of a difference signal between the calculated flow rate and a setting flow rate. The orifice clogging detection method includes a first step of holding the setting flow rate at a high setting flow rate of a 100% flow rate, a second step of switching the high setting flow rate to a low setting flow rate of a 0% flow rate, holding the low setting flow rate, and measuring the upstream side pressure to obtain pressure attenuation data, a third step of comparing the pressure attenuation data and reference pressure attenuation data measured when the orifice has no clogging under the same conditions, and a fourth step of reporting clogging when the pressure attenuation data after a predetermined time elapses from switching to the low setting flow rate is separated from the reference pressure attenuation data by a predetermined degree or more.

CITATION LIST

Patent Literature

Patent Literature 1: JP 2016-223533 A
Patent Literature 2: Japanese Patent No. 3546153

SUMMARY OF INVENTION

Technical Problem

Under the influence of the advanced and complicated semiconductor manufacturing process, a load on the valve mounted on the fluid supply line becomes severe, and the maintenance frequency and the product life cycle are shortened. For this reason, there is a need for a method that can accurately and simply determine an operation abnormality of the valve.

Further, the complexity of electric wiring and an air tube may cause an operation failure due to bending and torsion, and the connection destination of the wiring may be confused, which is inconvenient for maintenance or the like. Further, there is a need for simplifying the wiring to secure electromagnetic performance and realize noise reduction and response delay prevention. For this reason, a function and a structure for determining the abnormal operation of the valve should not cause complexity of the electric wiring and the air tube in consideration of such circumstances Accordingly, an object of the present invention is to enable accurate and simple diagnosis of an operation abnormality of a valve.

Solution to Problem

In order to achieve the above object, a valve according to one aspect of the present invention is a valve capable of detecting an operation abnormality. The valve has: a diaphragm depressor pressing the center portion of the diaphragm in conjunction with the actuator operation; a pressing adapter pressing a peripheral edge of the diaphragm; a magnetic sensor attached to the pressing adapter and detecting a change in distance between a magnet placed on the diaphragm depressor and the magnetic sensor; and an abnormality determination mechanism comparing a change in the distance between the magnet and the magnetic sensor at the time of abnormality diagnosis detected by the magnetic sensor and a previously measured change in the distance between the magnet and the magnetic sensor at the time of normality, and determining whether or not there is an abnormality.

The diaphragm depressor may be regulated to rotate in the circumferential direction by a rotation regulation mechanism.

The rotation regulation mechanism may have a groove formed in the axial direction of the diaphragm depressor, and a shaft rod slidably fitted into the groove.

An abnormality diagnosis method of a valve according to another aspect of the present invention is an abnormality diagnosis method of a valve including a diaphragm depressor pressing the center portion of the diaphragm in conjunction with the actuator operation, a pressing adapter pressing a peripheral edge of the diaphragm, and a magnetic sensor attached to the pressing adapter and detecting a change in distance between a magnet placed on the diaphragm depressor and the magnetic sensor. The abnormality diagnosis method has a step of comparing a change in the distance between the magnet and the magnetic sensor at the time of abnormality diagnosis detected by the magnetic sensor and a previously measured change in the distance between the magnet and the magnetic sensor at the time of normality, and determining whether or not there is an abnormality.

Advantageous Effects of Invention

According to the present invention, an operation abnormality of a valve can be diagnosed accurately and simply. Further, a fluid supply line does not become complicated.

DESCRIPTION OF EMBODIMENTS

Valve V1

Hereinafter, a valve according to an embodiment of the present invention and an abnormality diagnosis method of the valve will be described.

Figure 1:
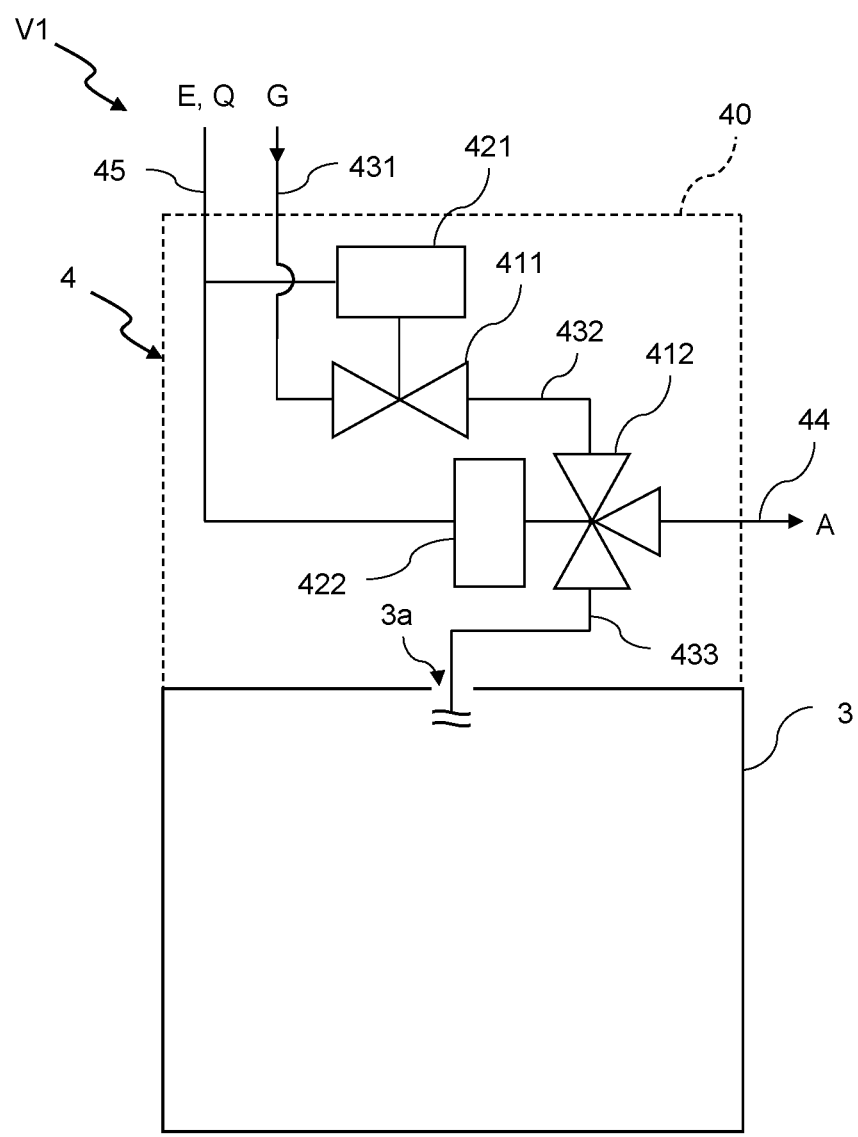
FIG. 1 is a schematic view illustrating an internal structure of a valve according to an embodiment of the present invention.

As illustrated in FIG. 1, a valve V1 according to the present embodiment includes a valve body 3 and a drive pressure control device 4 connected to the valve body 3.

The valve body 3 is a valve used in a gas line of a fluid control apparatus, such as a diaphragm valve, and includes at least a drive pressure introduction port 3a for introducing a drive pressure supplied from an outside to an inside.

The drive pressure control device 4 is connected to the drive pressure introduction port 3a of the valve body 3, and supplies a drive pressure supplied from a drive pressure supply source G to the valve body 3.

The drive pressure control device 4 includes drive pressure introduction paths 431, 432, and 433 as introduction paths for introducing the drive pressure from the drive pressure supply source G outside the line to the valve body 3. The drive pressure introduction path 431 is connected to the drive pressure supply source G outside the line. The drive pressure introduction path 432 connects the drive pressure introduction path 431 and the drive pressure introduction path 433 via an automatic valve 411 and an automatic valve 412. The drive pressure introduction path 433 is connected to the drive pressure introduction port 3a of the valve body 3.

Further, the drive pressure control device 4 is provided with a normally closed (N.C.) automatic valve 411 that opens and closes the drive pressure introduction path 431, and a normally opened (N.O.) automatic valve 412 that opens and closes the drive pressure introduction path 433 in conjunction with the automatic valve 411 and opens and closes an exhaust passage 44 for exhausting the drive pressure from the drive pressure introduction path 433 to the outside A of the device.

The automatic valves 411 and 412 are opened and closed by valve drive units 421 and 422, respectively. The valve drive units 421 and 422 receive power and an instruction signal for instructing an operation from a power supply source E and an instruction signal transmission source Q via wiring 45, and execute an operation based on the instruction signal.

Both the automatic valves 411 and 412 can be configured by various valves such as a normal solenoid valve, an air-operated solenoid valve, or an electric valve.

In the drive pressure control device 4, the automatic valves 411 and 412, the valve drive units 421 and 422, the drive pressure introduction paths 431, 432, and 433, and the like are covered with a hollow cap-shaped casing 40, and the valve body 3 is covered with the casing 40 so as to be integrated with the valve body 3.

The valve body 3 and the casing 40 can be appropriately integrated by a mechanism such as screwing or bonding with an adhesive.

In the drive pressure control device 4 having the above configuration, regardless of the opening/closing state of the automatic valves 411 and 412, the drive pressure supplied from the drive pressure supply source G outside the line is always supplied to a place of the automatic valve 411 via the drive pressure introduction path 431.

The opening/closing operation of the drive pressure control device 4 will be described. First, when the automatic valve 411 is opened by the valve drive unit 421, the drive pressure supplied to the automatic valve 411 is led to the automatic valve 412 via the drive pressure introduction path 432. Further, the automatic valve 412 is interlocked with the automatic valve 411, and is closed when the automatic valve 411 is opened, the exhaust passage 44 is closed, and the drive pressure is supplied to the valve body 3 via the drive pressure introduction path 433.

On the other hand, when the automatic valve 411 is closed by the valve drive unit 421, the drive pressure supplied from the drive pressure supply source G is blocked by the automatic valve 411. Further, the automatic valve 412 interlocked with the automatic valve 411 is opened, the exhaust passage 44 is opened, and the drive pressure in the valve body 3 is exhausted.

According to the valve V1 of the present embodiment, since the drive pressure control device 4 and the valve body 3 are integrally connected, wiring connected to the valve V1 can be simplified.

Further, the drive pressure is always supplied to a place of the automatic valve 411 of the drive pressure control device 4 integrally connected to the valve body 3, and a state where the drive pressure is increased to a constant pressure in a place close to the drive pressure introduction port 3a of the valve body 3 is maintained. As a result, the valve body 3 is less susceptible to a change in the drive pressure at the time of opening/closing, the opening/closing speed can be maintained constantly, and accuracy of controlling material gas can be improved.

Although the valve V1 described above has the structure in which the drive pressure control device 4 is connected to the valve body 3, the present invention is not limited thereto. A space for incorporating the drive pressure control device 4 is secured in the valve body 3, so that the drive pressure control device 4 can be incorporated in the space.

Next, a fluid supply line configured by the above-described valve V1 will be described.

Figure 2:
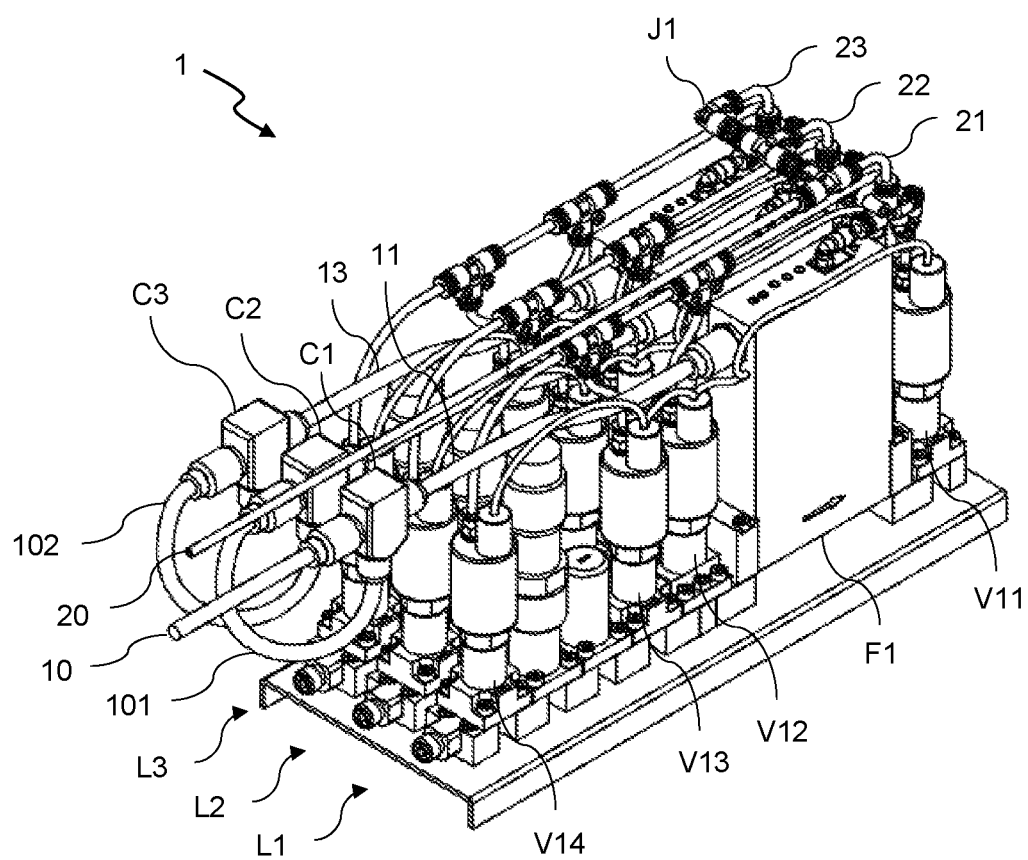
FIG. 2 is an external perspective view illustrating a gas unit configured by a fluid supply line including a valve according to an embodiment of the present invention.
Figure 3:
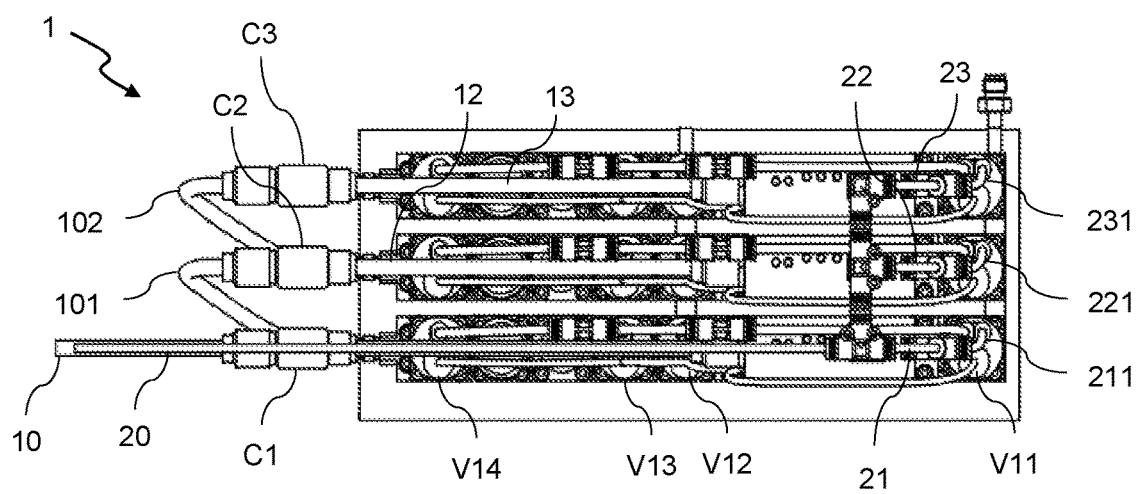
FIG. 3 is a plan view illustrating a gas unit configured by a fluid supply line including a valve according to the present embodiment.
Figure 4:
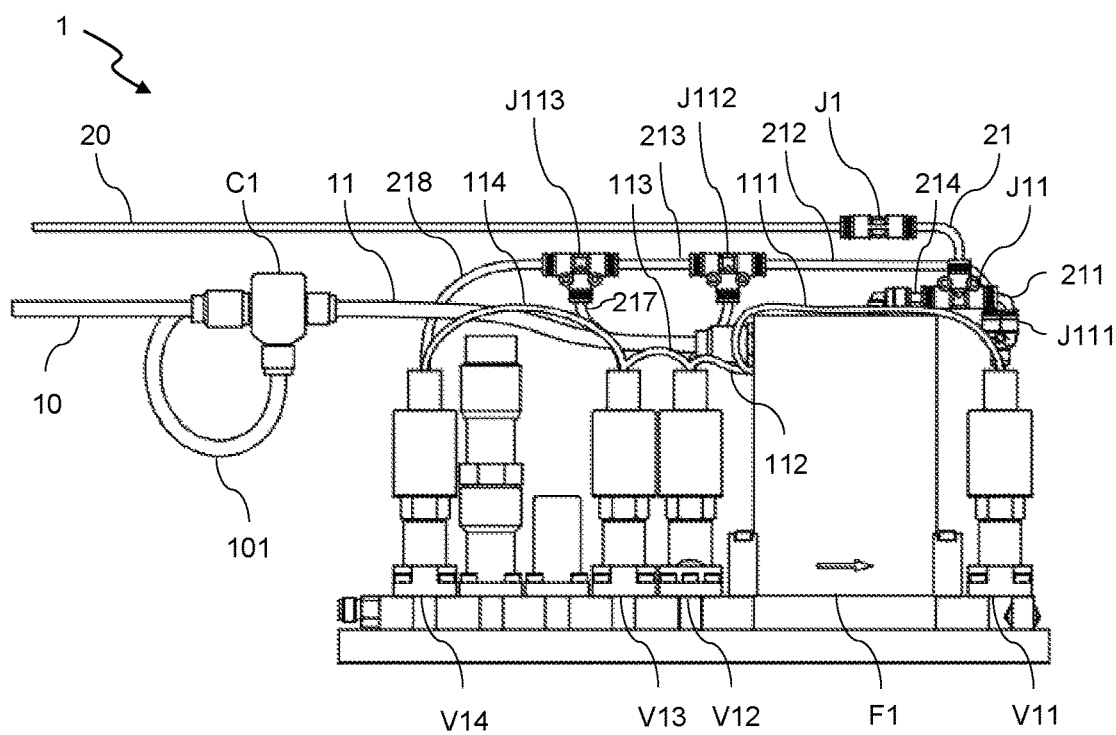
FIG. 4 is a side view illustrating a gas unit configured by a fluid supply line including a valve according to the present embodiment.

As illustrated in FIGS. 2 to 4, a gas unit 1 includes three fluid supply lines L1, L2, and L3 according to the present embodiment.

Here, the "fluid supply lines (L1, L2, and L3)" are one of constituent units of the gas unit (1), and include a path through which a process fluid circulates and a group of fluid control devices arranged on the path. The fluid supply lines (L1, L2, and L3) are minimum constituent units that can control the process fluid and independently process a processed object. The gas unit is normally configured by arranging a plurality of fluid supply lines in parallel. Further, "outside the line" mentioned in the following description is a portion or mechanism that does not configure the fluid supply line, and a mechanism outside the line includes a power supply source for supplying power required for driving the fluid supply line, a drive pressure supply source for supplying a drive pressure, a device configured to be able to communicate with the fluid supply line, and the like.

Each of the fluid supply lines L1, L2, and L3 causes a plurality of fluid control devices to communicate with each other fluid-tightly, and the fluid control devices include valves (V11 to V14, V21 to V24, and V31 to V34) each including the above-described valve V1 and flow rate control devices (F1 to F3). In the following description, the valves (V11 to V14, V21 to V24, and V31 to V34) may be collectively referred to as the valve V1, and the flow rate control devices (F1 to F3) may be collectively referred to as the flow rate control device F.

The flow rate control device F is a device that controls a flow rate of a fluid in each of the fluid supply lines L1, L2, and L3.

The flow rate control device F can be configured by a flow rate range variable type flow rate control device, for example. The flow rate range variable type flow rate control device is a device that can automatically switch and select a flow rate control region by operating a switching valve.

The flow rate range variable type flow rate control device has, for example, a fluid passage for a small flow rate and a fluid passage for a large flow rate as a fluid passage to a flow rate detection unit of the flow rate control device. A fluid in a small flow rate region is circulated to the flow rate detection unit through the fluid passage for the small flow rate and a detection level of the flow rate control unit is switched to a detection level suitable for the detection of the flow rate of the small flow rate region, and a fluid in a large flow rate region is circulated to the flow rate detection unit through the fluid passage for the large flow rate and the detection level of the flow rate control unit is switched to a detection level suitable for the detection of the flow rate of the large flow rate region. As a result, the flow rate is controlled by switching the fluid in each of the large flow rate region and the small flow rate region.

Further, the flow rate range variable type flow rate control device is a pressure type flow rate control device in which a flow rate of a fluid circulating through an orifice is calculated as $Qc=KP_1$ (K is a proportional constant) or $Qc=KP_2{}^m(P_1-P_2)^n$ (K is a proportional constant and m and n are constants) by using an orifice upstream side pressure $P_1$ and/or an orifice downstream side pressure $P_2$. A fluid passage between the downstream side of a control valve of the pressure type flow rate control device and a fluid supply pipeline can be configured as at least two or more parallel fluid passages, and an orifice with a different fluid flow rate characteristic can be interposed in each parallel fluid passage. In this case, the fluid in the small flow rate region is circulated to one orifice for flow rate control of the fluid in the small flow rate region, and the fluid in the large flow rate region is circulated to at least the other orifice for flow rate control of the fluid in the large flow rate region.

Further, a range of the flow rate can be set in three stages. In this case, the orifices are set as three types of orifices including a large flow rate orifice, an intermediate flow rate orifice, and a small flow rate orifice. Further, a first switching valve, a second switching valve, and the large flow rate orifice are interposed in series in one fluid passage, the small flow rate orifice and the intermediate flow rate orifice are interposed in the other fluid passage, and a passage communicating between the two switching valves and a passage communicating between the small flow rate orifice and the intermediate flow rate orifice are caused to communicate with each other.

According to the flow rate range variable type flow rate control device, it is possible to maintain high control accuracy while expanding a flow rate control range.

Further, in another example, the flow rate control device F can be configured by a differential pressure type flow rate control device. The differential pressure type flow rate control device is a device that uses a flow rate calculation formula derived from Bernoulli's theorem as a basis and calculates and controls a fluid flow rate by adding various corrections thereto.

The differential pressure type flow rate control device has a control valve including a valve drive unit, an orifice provided on the downstream side of the control valve, a detector for a fluid pressure $P_1$ of the upstream side of the orifice, a detector for a fluid pressure $P_2$ of the downstream side of the orifice, and a detector for a fluid temperature T of the upstream side of the orifice. By using an incorporated control arithmetic circuit, a fluid flow rate Q is calculated by $Q=C_1 \cdot P_1/\sqrt{T} \cdot ((P_2/P_1)_m-(P_2/P_1)n)^{1/2}$ (where $C_1$ is a proportional constant, and m and n are constants) using a detection pressure and a detection temperature from each detector, and a difference between the calculated flow rate and the setting flow rate is calculated.

According to the differential pressure type flow rate control device, it can be used in an in-line form without restrictions on a mounting posture. Further, a control flow rate is hardly affected by a variation in the pressure, and highly accurate flow rate measurement or flow rate control can be performed in real time.

The flow rate control device F includes an operation information acquisition mechanism that acquires operation information of the flow rate control device F, and an information processing module that collects operation information of the valves V1 forming the same line, monitors the valves V1, and controls each valve V1.

The operation information acquisition mechanism can include, for example, various sensors incorporated in the flow rate control device F, arithmetic devices for performing the flow rate control, an information processing module for executing processing of information of the sensors and the arithmetic devices, and the like.

In particular, with respect to the valves V1 configuring the same fluid supply lines L1, L2, and L3, by supplying a drive pressure from a mechanism outside the line via the flow rate control device F or enabling communication, the operation information of each valve V1 can be collected in the flow rate control device F. As a result, operation information of the entire line is configured together with the operation information of each valve V1 and the operation information of the flow rate control device F.

The valve V1 has the above-described configuration as an operation mechanism, and as a function or a mechanism capable of detecting its own operation abnormality, an operation information acquisition mechanism that acquires operation information of the valve V1 and an information processing module for processing data detected by the operation information acquisition mechanism are incorporated in the valve V1.

Figure 5:
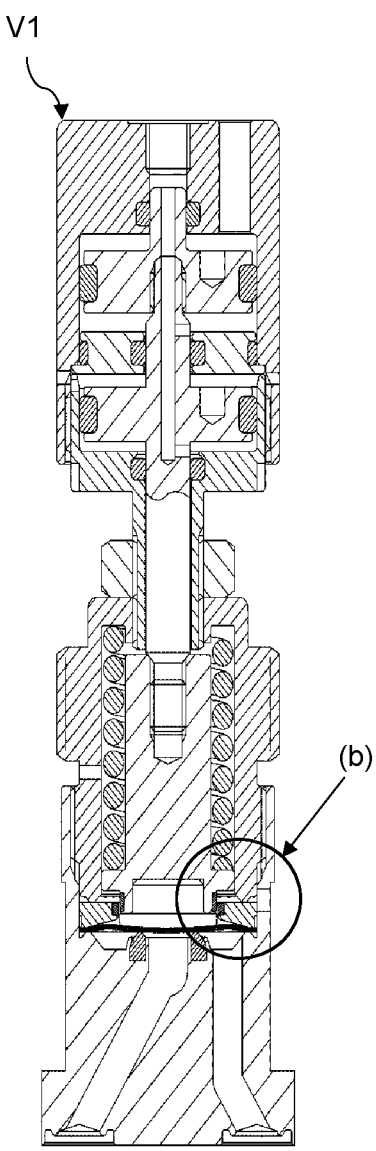
FIG. 5 is a cross-sectional view illustrating an internal structure of a valve according to the present embodiment, in which (a) is an overall view and (b) is a partial enlarged view.
Figure 5:
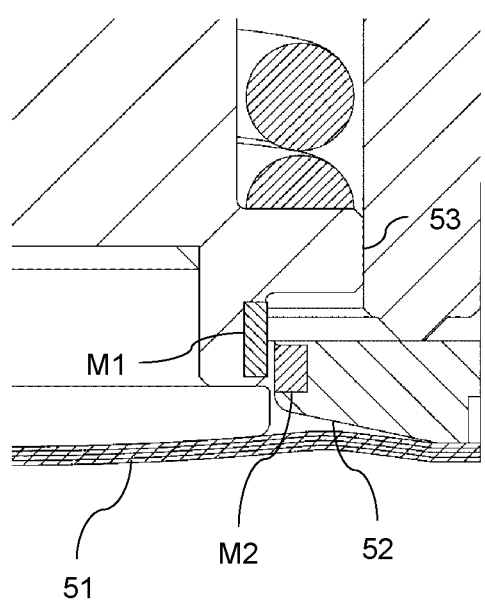

FIG. 5 illustrates an example of a specific configuration of the valve V1.

The valve V1 has a magnetic sensor M2 and a magnet M1 as the operation information acquisition mechanism. The magnetic sensor M2 is attached to a surface facing a stem 53, inside of a pressing adapter 52 that presses a peripheral edge of a diaphragm 51. Further, the magnet M1 is attached in the vicinity of the pressing adapter 52 of the stem 53 that slides according to the opening/closing operation of the valve V1.

The magnetic sensor M2 can measure not only an opening/closing state but also an opening degree of the valve V1 by sensing a change in the distance from the magnet M1 attached to a predetermined position.

A cable or the like for transmitting and receiving measured data may be connected to the magnetic sensor M2, while the magnet M1 does not require such a wired connection. Therefore, by attaching the magnet M1 to the stem 53 moving vertically and attaching the magnetic sensor M2 to the pressing adapter 52 whose position is fixed in the valve V1, the cable connected to the magnetic sensor M2 moves with the operation of the valve V1, and it is possible to prevent a situation that causes an operation failure.

Here, the magnetic sensor M2 has a planar coil, an oscillation circuit, and an integration circuit, and an oscillation frequency changes according to a change in the distance from the magnet M1 located at the facing position. In addition, by converting the frequency by the integration circuit and obtaining an integrated value, not only the opening/closing state of the valve V1 but also the opening degree at the time of opening the valve can be measured.

Figure 6:
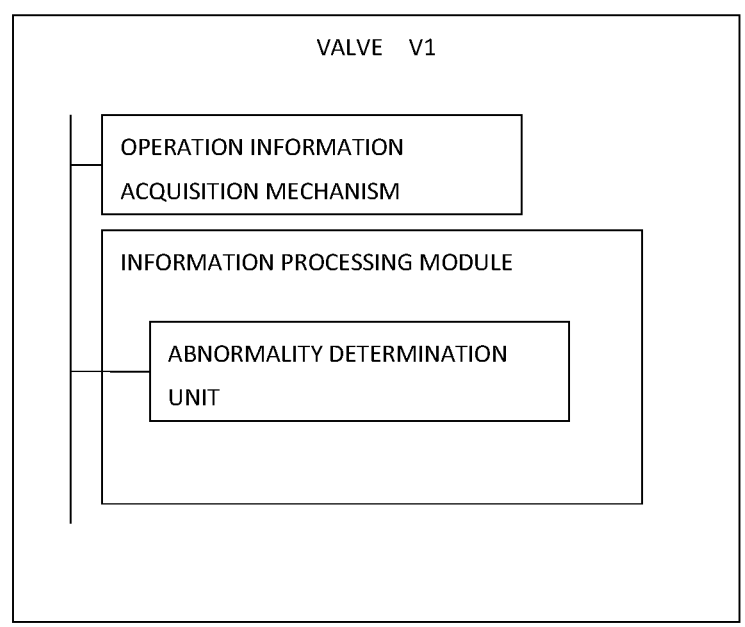
FIG. 6 is a functional diagram illustrating an example of a functional configuration of a valve according to the present embodiment.

Further, as illustrated in FIG. 6, the information processing module incorporated in the valve V1 has an abnormality determination unit as a functional unit that determines whether or not there is an abnormality in the valve V1, on the basis of the data acquired by the magnetic sensor M2. The abnormality determination unit compares a change in the distance between the magnet M1 and the magnetic sensor M2 detected by the magnetic sensor M2 and a previously measured change in the distance between the magnet M1 and the magnetic sensor M2 at the time of normality and determines whether or not there is an abnormality.

Abnormality Determination Unit

Here, processing that can be executed by the abnormality determination unit will be described.

First, the abnormality determination unit can determine the presence or absence of an abnormality according to whether or not a top surface or bottom surface position of the stem 53 at the time of abnormality diagnosis is a top surface or bottom surface position at the time of normality. That is, the top surface position and the bottom surface position when the stem 53 is operated are measured on the basis of a change in the distance between the magnetic sensor M2 and the magnet M1. It is determined whether or not the top surface position and the bottom surface position are matched with the previously measured top surface position and bottom surface position at the time of normality. If they are matched, it can be determined that there is no abnormality, and if they are not matched, it can be determined that there is an abnormality.

Further, the abnormality determination unit can determine the presence or absence of the abnormality according to whether or not the stroke of the stem 53 at the time of abnormality diagnosis is matched with the stroke at the time of normality. That is, a movement distance (stroke) from the top surface position to the bottom surface position when the stem 53 is operated is measured on the basis of the change in the distance between the magnetic sensor M2 and the magnet M1. It is determined whether or not the stroke is matched with the previously measured stroke at the time of normality. If they are matched, it can be determined that there is no abnormality, and if they are not matched, it can be determined that there is an abnormality.

Further, the abnormality determination unit can determine the presence or absence of the abnormality according to whether or not the operating speed of the stem 53 at the time of abnormality diagnosis is matched with the operating speed at the time of normality. That is, the operating speed at the time of operating the stem 53 is measured on the basis of a change in the distance between the magnetic sensor M2 and the magnet M1. It is determined whether or not the operating speed is matched with the previously measured operating speed at the time of normality. If they are matched, it can be determined that there is no abnormality, and if they are not matched, it can be determined that there is an abnormality.

According to the configuration of the valve V1 and the abnormality diagnosis method thereof, it is possible to accurately and simply diagnose an operation abnormality of the valve V1. Further, since the abnormality diagnosis mechanism is integrated in the valve V1, the gas unit 1 does not become complicated. As a result, the electric wiring and the air tube do not become complicated and do not cause an operation failure due to bending or twisting, and satisfy requirements such as securing electromagnetic performance, reducing noise, and preventing response delay.

In the above-described example, although the valve V1 includes the information processing module configuring the abnormality determination unit, the present invention is not limited thereto. A server or the like provided outside the valve V1 or outside the fluid supply lines L1, L2, and L3 may be provided with the functions provided in the information processing module. In this case, it is possible to confirm an operation abnormality of each valve V1 while integrally monitoring the plurality of valves V1 configuring the fluid supply lines L1, L2, and L3.

Further, as the operation information acquisition mechanism, in addition to the magnetic sensor M2 described above, a pressure sensor, a temperature sensor, a limit switch, and the like may be appropriately attached to predetermined locations. The pressure sensor is configured by, for example, a pressure-sensitive element for detecting a pressure change in a predetermined space, a piezoelectric element for converting a detection value of a pressure detected by the pressure-sensitive element into an electric signal, and the like, and detects a pressure change in the sealed internal space.

Further, the temperature sensor is, for example, a sensor for measuring the temperature of the fluid. The temperature sensor is installed in the vicinity of the flow passage to measure the temperature of the corresponding location, so that the temperature of the installation location can be regarded as the temperature of the fluid circulating through the flow passage.

Further, the limit switch is fixed in the vicinity of a piston, for example, and the switch is switched according to a vertical movement of the piston. As a result, the number of times of opening/closing the valve V1, the frequency of opening/closing thereof, the opening/closing speed thereof, and the like can be detected.

The information acquired by the operation information acquisition mechanism in the valve V1 and the information processed by the information processing module can be collected in the flow rate control devices F configuring the same fluid supply lines L1, L2, and L3.

The gas unit 1 is connected to a mechanism outside the line including a drive pressure supply source that supplies a drive pressure, a power supply source that supplies power, a communication device that performs communication, and the like.

Here, the fluid control device configuring the gas unit 1 is connected by a first connection mechanism that directly connects the mechanism outside the line and the predetermined fluid control device, and a second connection mechanism that branches from the first connection mechanism or uses the fluid control device connected by the first connection mechanism and connects the mechanism outside the line and another fluid control device. Specifically, in the case of the fluid supply line L1, in FIG. 7 which will be described in detail later, in the power supply from the outside of the line and the communication with the outside of the line, a main cable 10 and an extension cable 11 configure the first connection mechanism, and sub-cables 111, 112, 113, and 114 configure the second connection mechanism. Further, in FIG. 8 which will be described in detail later, in the supply of the drive pressure from the outside of the line, a main tube 20, an extension tube 21, and a sub-tube 214 configure the first connection mechanism, and extension tubes 211, 212, and 213 and sub-tubes 215, 216, 217, and 218 configure the second connection mechanism.

Figure 7:
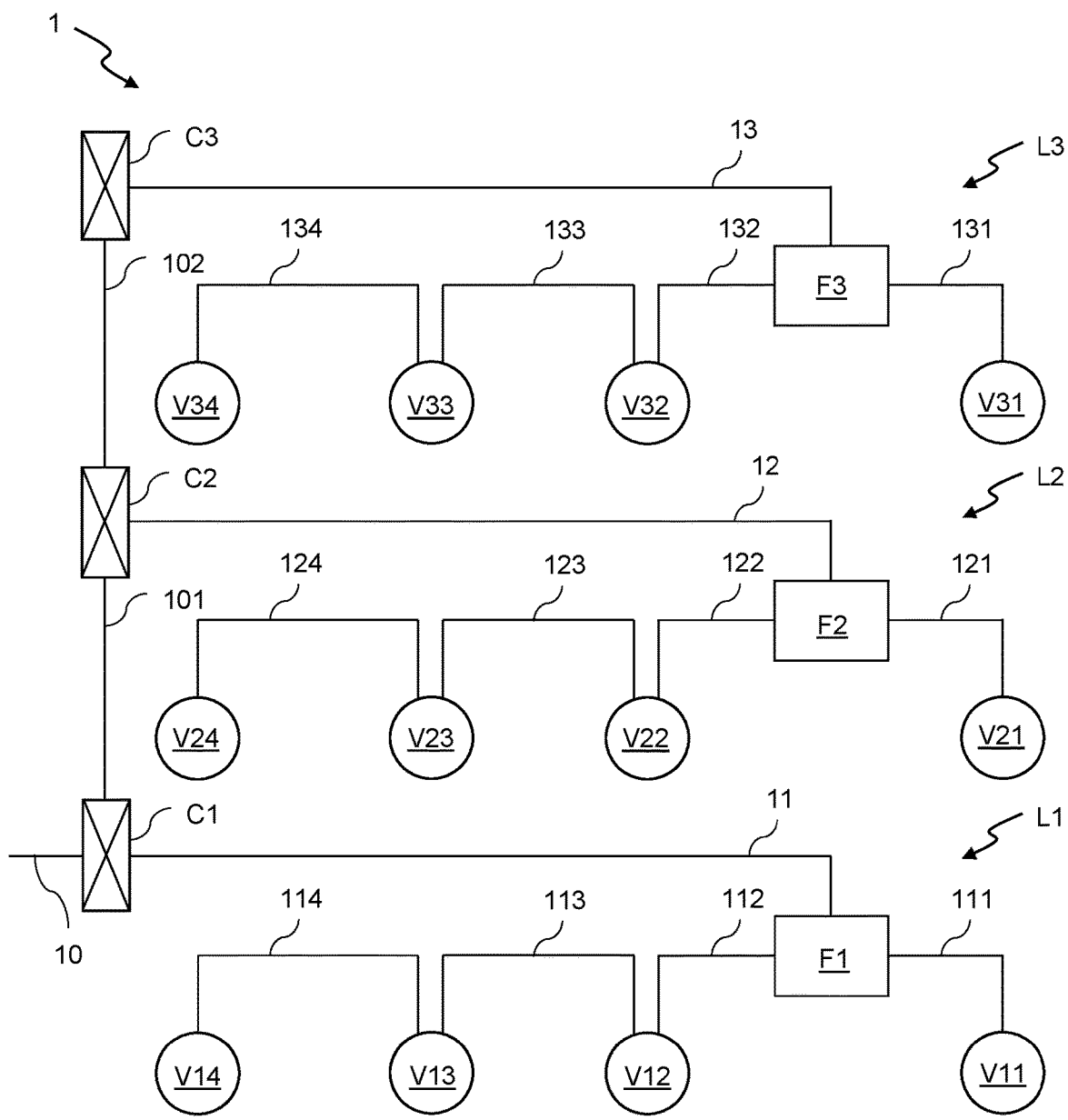
FIG. 7 is a schematic diagram illustrating a wiring structure of a cable in a gas unit configured by a fluid supply line including a valve according to the present embodiment.

As illustrated in FIG. 7, the power supply and the communication with the outside of the line are enabled by the main cable 10 that connects the mechanism outside the line and the gas unit 1.

The main cable 10 branches into an extension cable 11 and a branch cable 101 by a branch connector C1 provided in the vicinity of the gas unit, the branch cable 101 branches into an extension cable 12 and a branch cable 102 by a branch connector C2, and the branch cable 102 is connected to an extension cable 13 via a branch connector C3.

Looking at each of the fluid supply lines L1, L2, and L3, in the fluid supply line L1, the extension cable 11 is connected to the flow rate control device F1. The sub-cables 111 and 112 are led out from the flow rate control device F1 to which the extension cable 11 is connected, the sub-cable 111 is connected to the valve V11, and the sub-cable 112 is connected to the valve V12.

Further, the sub-cable 113 is led out from the valve V12 to which the sub-cable 112 is connected, and the sub-cable 113 is connected to the valve V13. Further, the sub-cable 114 is led out from the valve V13 to which the sub-cable 113 is connected, and the sub-cable 114 is connected to the valve V14.

The fluid supply line L2 is also connected to the mechanism outside the line by the same configuration as that of the fluid supply line L1.

That is, the extension cable 12 is connected to the flow rate control device F2. The sub-cables 121 and 122 are led out from the flow rate control device F2 to which the extension cable 12 is connected, the sub-cable 121 is connected to the valve V21, and the sub-cable 122 is connected to the valve V22.

In addition, the sub-cable 123 is led out from the valve V22 to which the sub-cable 122 is connected, and the sub-cable 123 is connected to the valve V23. Further, the sub-cable 124 is led out from the valve V23 to which the sub-cable 123 is connected, and the sub-cable 124 is connected to the valve V24.

The fluid supply line L3 is also connected to the mechanism outside the line by the same configuration as that of the fluid supply line L1.

That is, the extension cable 13 is connected to the flow rate control device F3. The sub-cables 131 and 132 are led out from the flow rate control device F3 to which the extension cable 13 is connected, the sub-cable 131 is connected to the valve V31, and the sub-cable 132 is connected to the valve V32.

In addition, the sub-cable 133 is led out from the valve V32 to which the sub-cable 132 is connected, and the sub-cable 133 is connected to the valve V33. Further, the sub-cable 134 is led out from the valve V33 to which the sub-cable 133 is connected, and the sub-cable 134 is connected to the valve V34.

Here, for the fluid supply line L1, the extension cable 11 is connected to the flow rate control device F1, and the sub-cables 111 and 112 are led out from the flow rate control device F1. However, in the flow rate control device F1, the extension cable 11 and the sub-cables 111 and 112 are connected. The connection can be made by using the information processing module provided in the flow rate control device F1 or branching the extension cable 11.

Even in the valves V12 and V13, the sub-cable 112 is connected to the sub-cable 113, and the sub-cable 113 is connected to the sub-cable 114. The connection of the sub-cables 112, 113, and 114 can also be made by using information processing modules provided in the valves V12 and V13 or branching the sub-cables 112 and 113.

For any connection, the mechanism outside the line and the valves V11, V12, V13, and V14 may be communicably connected via the flow rate control device F1 and power may be supplied.

The same is applied to connections in the other fluid supply lines L2 and L3, and the valves V21, V22, V23, and V24 are connected to the mechanism outside the line via the flow rate control device F2 by the main cable 10, the extension cable 12, and the sub-cables 121, 122, 123, and 124. Further, the valves V31, V32, V33, and V34 are connected to the mechanism outside the line via the flow rate control device F3 by the main cable 10, the extension cable 13, and the sub-cables 131, 132, 133, and 134.

Figure 8:
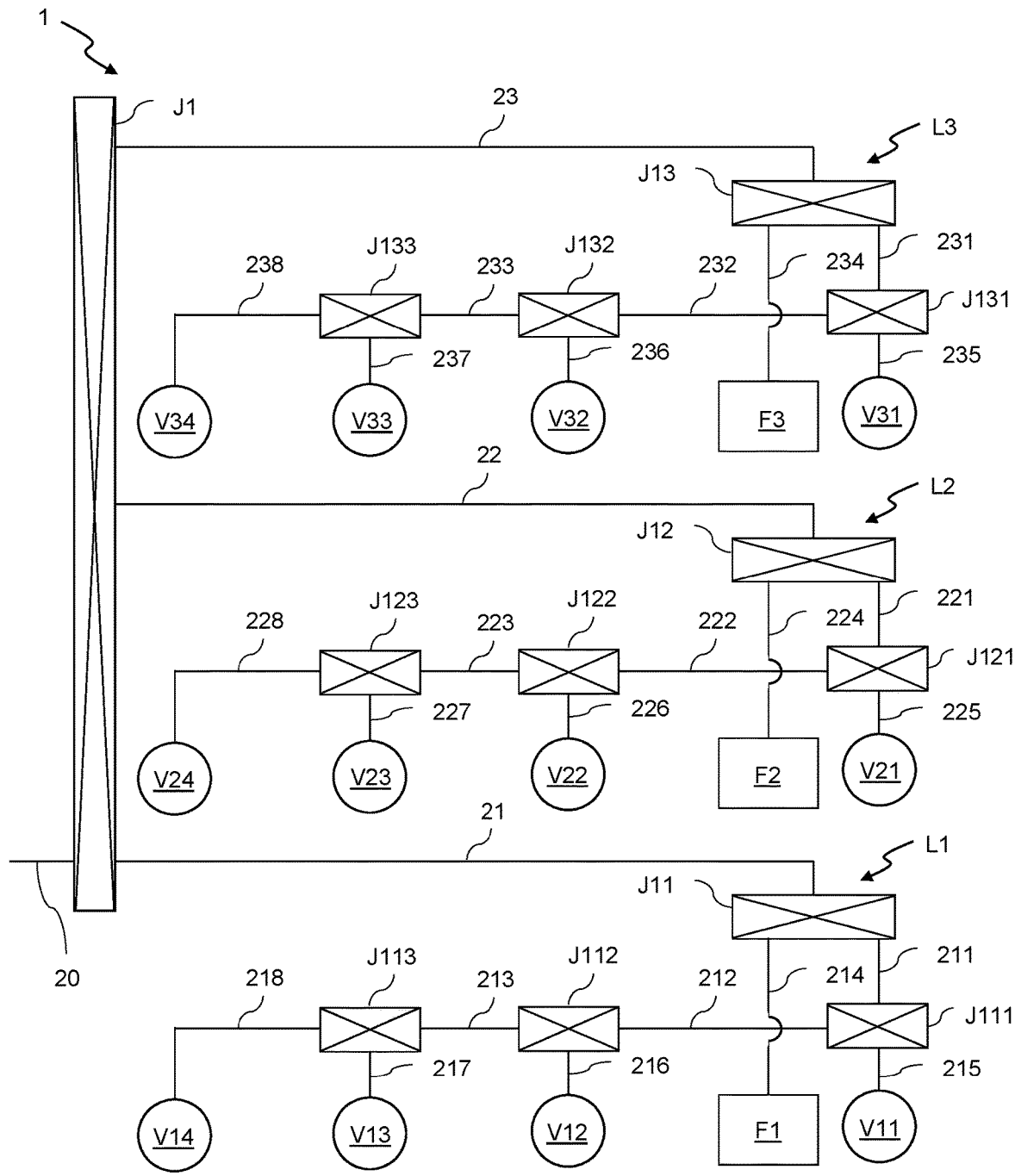
FIG. 8 is a schematic diagram illustrating a connection structure of a drive pressure supply path in a gas unit configured by a fluid supply line including a valve according to the present embodiment.

As illustrated in FIG. 8, the drive pressure is supplied from the mechanism outside the line to the gas unit by the main tube 20.

The main tube 20 branches into extension tubes 21, 22, and 23 for respectively supplying the drive pressure to the fluid supply lines L1, L2, and L3 by a branch joint J1 provided in the vicinity of the gas unit.

Looking at each of the fluid supply lines L1, L2, and L3, in the fluid supply line L1, the extension tube 21 is branched into the extension tube 211 and the sub-tube 214 by a joint J11. The sub-tube 214 is connected to the flow rate control device F1, so that the drive pressure is supplied to the flow rate control device F1.

The extension tube 211 is further branched into the extension tube 212 and the sub-tube 215 by a joint J111. The sub-tube 215 is connected to the valve V11, so that the drive pressure is supplied to the valve V11.

Similarly, the extension tube 212 is further branched into the extension tube 213 and the sub-tube 216 by a joint J112. The sub-tube 216 is connected to the valve V12, so that the drive pressure is supplied to the valve V12.

Further, the extension tube 213 is further branched into a sub-tube 217 and a sub-tube 218 by a joint J113. The sub-tube 217 is connected to the valve V13, so that the drive pressure is supplied to the valve V13. Further, the sub-tube 218 is connected to the valve V14, so that the drive pressure is supplied to the valve V14.

The drive pressure is also supplied to the fluid supply line L2 by the same configuration as that of the fluid supply line L1.

That is, the extension tube 22 is branched into an extension tube 221 and a sub-tube 224 by a joint J12. The sub-tube 224 is connected to the flow rate control device F2, so that the drive pressure is supplied to the flow rate control device F2.

The extension tube 221 is further branched into an extension tube 222 and a sub-tube 225 by a joint J121. The sub-tube 225 is connected to the valve V21, so that the drive pressure is supplied to the valve V21.

Similarly, the extension tube 222 is further branched into an extension tube 223 and a sub-tube 226 by a joint J122. The sub-tube 226 is connected to the valve V22, so that the drive pressure is supplied to the valve V22.

Further, the extension tube 223 is further branched into a sub-tube 227 and a sub-tube 228 by a joint J123. The sub-tube 227 is connected to the valve V23, so that the drive pressure is supplied to the valve V23. Further, the sub-tube 228 is connected to the valve V24, so that the drive pressure is supplied to the valve V24.

The drive pressure is also supplied to the fluid supply line L3 by the same configuration as that of the fluid supply line L1.

That is, the extension tube 23 is branched into an extension tube 231 and a sub-tube 234 by a joint J13. The sub-tube 234 is connected to the flow rate control device F3, so that the drive pressure is supplied to the flow rate control device F3.

The extension tube 231 is further branched into an extension tube 232 and a sub-tube 235 by a joint J131. The sub-tube 235 is connected to the valve V31, so that the drive pressure is supplied to the valve V31.

Similarly, the extension tube 232 is further branched into an extension tube 233 and a sub-tube 236 by a joint J132. The sub-tube 236 is connected to the valve V32, so that the drive pressure is supplied to the valve V32.

Further, the extension tube 233 is further branched into a sub-tube 237 and a sub-tube 238 by a joint J133. The sub-tube 237 is connected to the valve V33, so that the drive pressure is supplied to the valve V33. Further, the sub-tube 238 is connected to the valve V34, so that the drive pressure is supplied to the valve V34.

Figure 9:
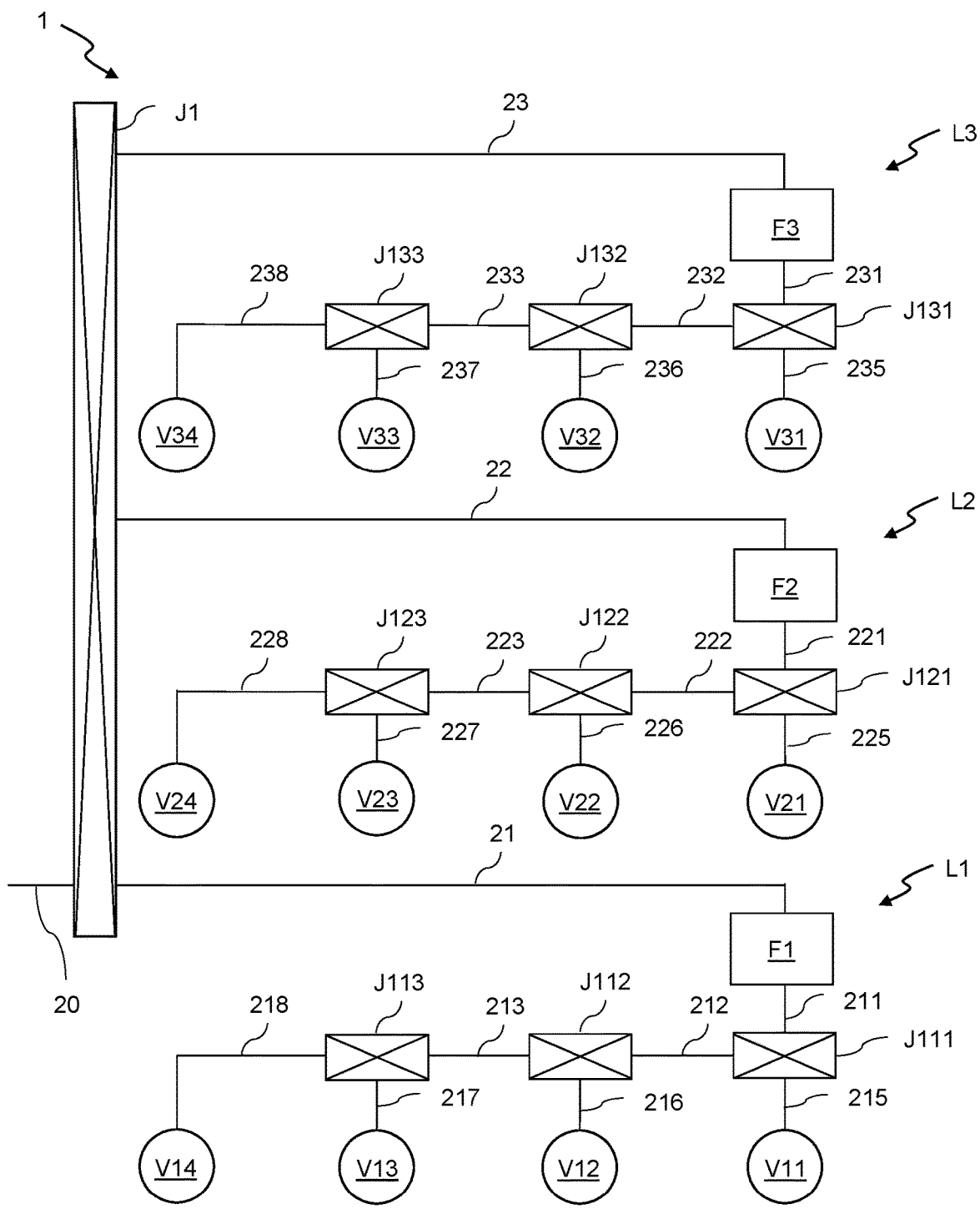
FIG. 9 is a schematic diagram illustrating a connection structure of a drive pressure supply path in a gas unit configured by a fluid supply line according to a modification of the present embodiment.

Here, for the fluid supply line L1, the flow rate control device F1 and the valves V11, V12, V13, and V14 are connected to the extension tube 21 and the main tube 20 in front of the extension tube 21 via the joints J11, J111, J112, and J113, the extension tubes 211, 212, and 213, and the sub-tubes 214, 215, 216, 217, and 218. However, the present invention is not limited thereto. As illustrated in FIG. 9, after connecting the extension tube 21 and the flow rate control device F1, the drive pressure can be supplied from the flow rate control device F1 to each of the valves V11, V12, V13, and V14. In this case, a mechanism for distributing the drive pressure supplied from the main tube 20 to the valves V11, V12, V13, and V14 may be provided in the flow rate control device F1, or the main tube drawn into the flow rate control device F1 may be branched in the flow rate control device F1.

The same can be applied to the fluid supply lines L2 and L3.

According to the configurations of the fluid supply lines L1, L2, and L3, the cable for performing the power supply or the communication is simplified, noise can be reduced, and delay in the transmission speed of the instruction signal can be suppressed. Further, since the inner volume of the tube supplying the drive pressure can be reduced, the opening/closing speed of each fluid control device such as the valve V1 and the flow rate control device F can be maintained, and an error can be prevented from occurring in the opening/closing speed of each fluid control device. As a result, it is possible to improve control accuracy of the fluid supply lines L1, L2, and L3 by suppressing a variation in the operation of each of the fluid control devices.

Further, in this case, each valve V1 is communicably connected to the flow rate control device F. If the flow rate control device F can identify and control each valve V1, each valve V1 configuring the same line can be individually identified to diagnose the presence or absence of an abnormality, or the operation of each valve V1 viewed from the entire line can be analyzed.

The operation information of the fluid supply lines L1, L2, and L3 collected in the flow rate control devices F1, F2, and F3 can be transmitted to an external information processing device via the main cable 10 to diagnose the presence or absence of the abnormality or analyze the operation in the information processing device. The external information processing device may configure a part of the mechanism outside the line, or may be a device connected to be communicable with the mechanism outside the line. Further, the external information processing device can be configured by a so-called server computer or the like.

Figure 10:
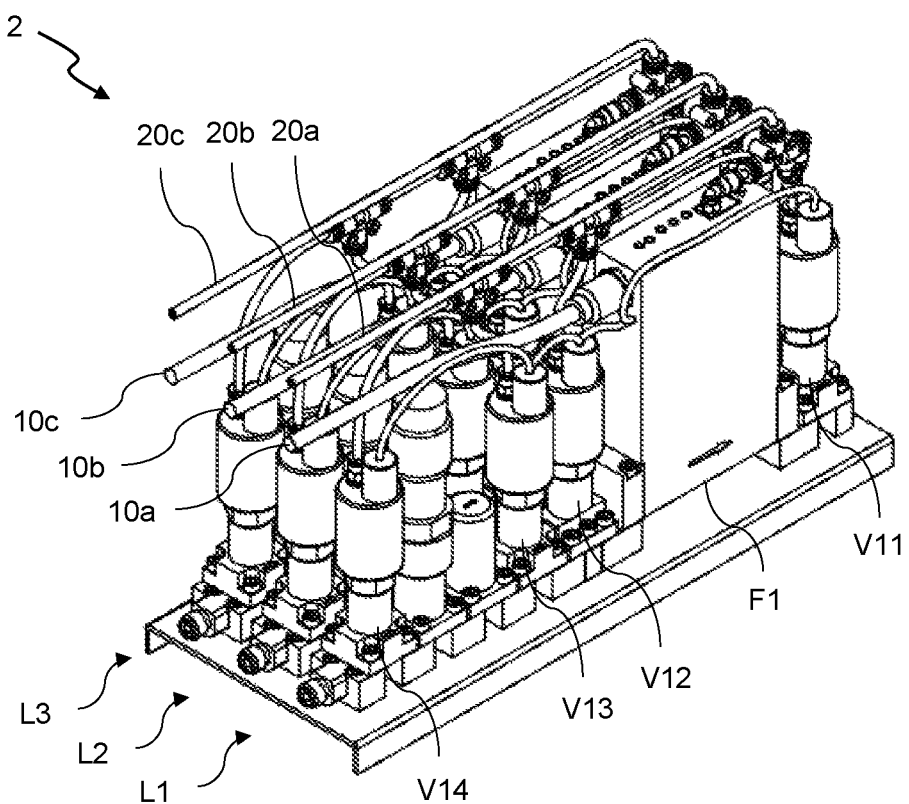
FIG. 10 is an external perspective view illustrating a gas unit configured by a fluid supply line according to another embodiment of the present invention.
Figure 11:
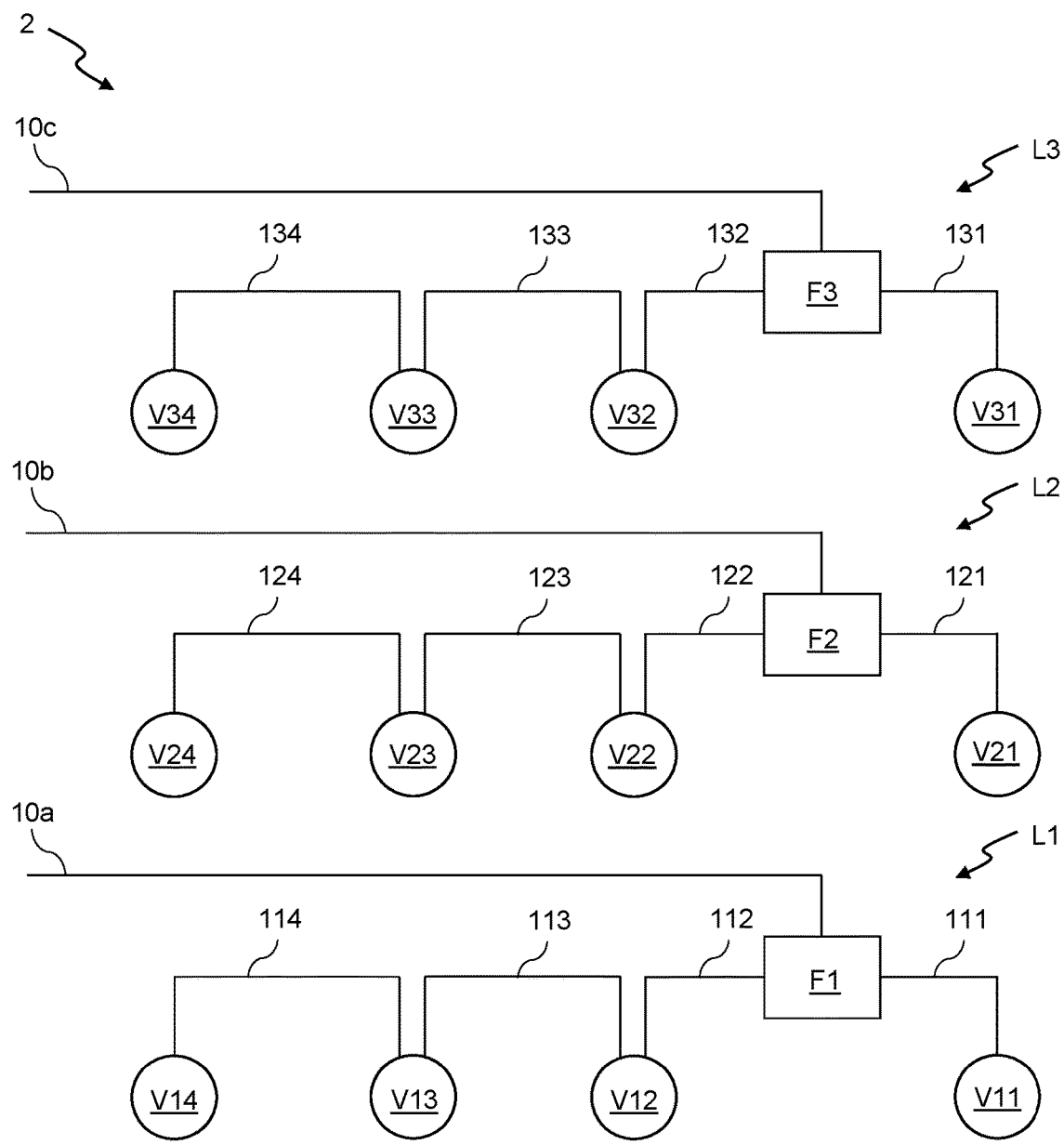
FIG. 11 is a schematic diagram illustrating a wiring structure of a cable in a gas unit configured by a fluid supply line according to another embodiment of the present invention.
Figure 12:
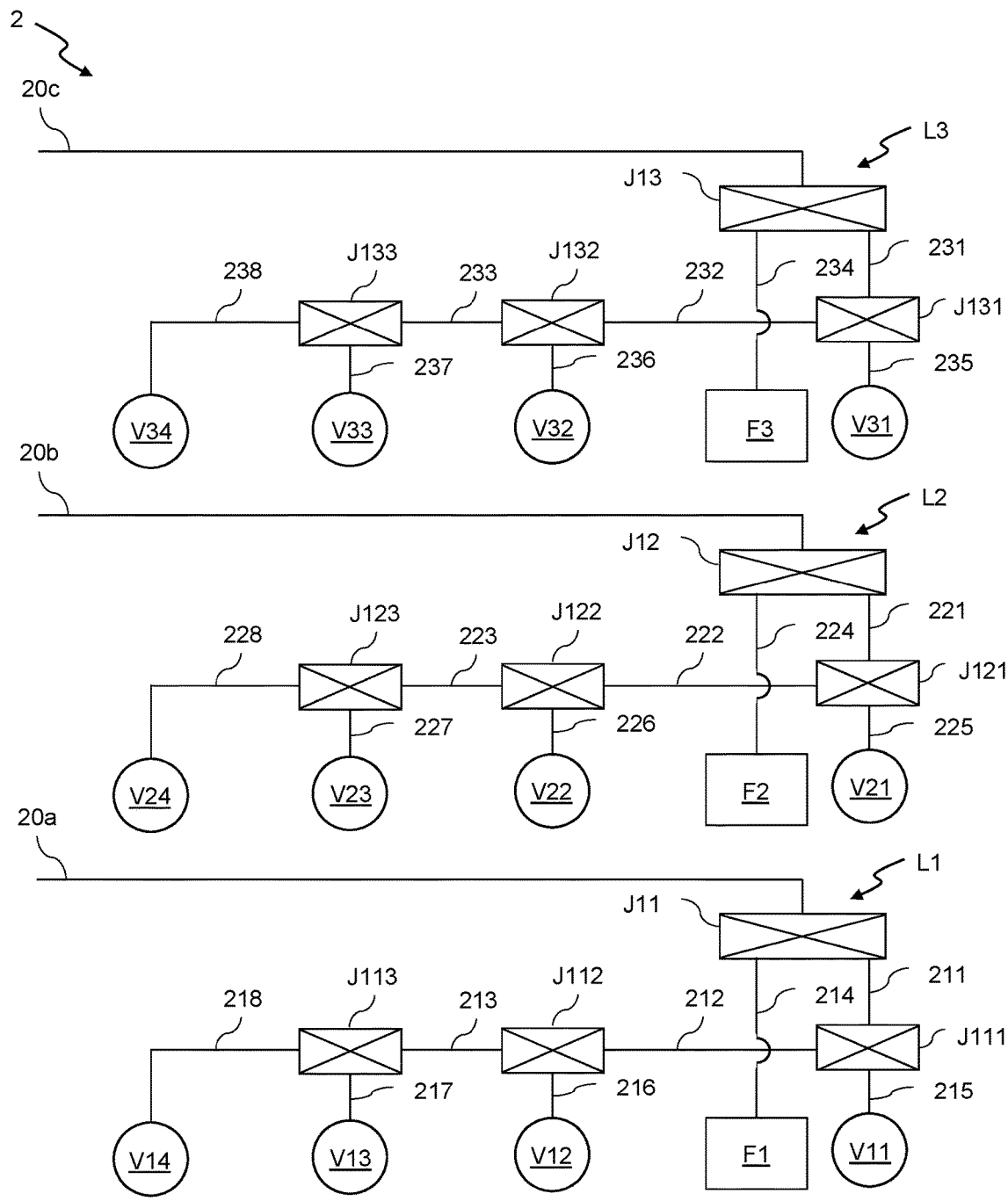
FIG. 12 is a schematic diagram illustrating a connection structure of a drive pressure supply path in a gas unit configured by a fluid supply line according to another embodiment of the present invention.

The fluid supply lines L1, L2, and L3 described above can also configure a gas unit 2 illustrated in FIGS. 10 to 12.

Unlike the gas unit 1, the fluid supply lines L1, L2, and L3 configuring the gas unit 2 are individually connected to the mechanism outside the line.

That is, as illustrated in FIG. 11, power supply to the gas unit 2 and communication between the gas unit 2 and the outside of the line can be performed by a main cable 10a connecting the mechanism outside the line and the fluid supply line L1, a main cable 10b connecting the mechanism outside the line and the fluid supply line L2, and a main cable 10c connecting the mechanism outside the line and the fluid supply line L3.

In each of the fluid supply lines L1, L2, and L3, connection from the flow rate control device F to the valve V1 is the same as that of the gas unit 1.

Further, as illustrated in FIG. 12, the drive pressure is supplied from the mechanism outside the line to the gas unit 2 by main tubes 20a, 20b, and 20c for the fluid supply lines L1, L2, and L3.

In each of the fluid supply lines L1, L2, and L3, connections from the joints J11, J12, and J13 to the flow rate control device F or the valve V1 are the same as those of the gas unit 1.

In the above-described embodiment, each of the gas units 1 and 2 is configured by the three fluid supply lines L1, L2, and L3. However, an application of the present invention is not limited by the number of lines.

Further, the embodiments of the present invention are not limited to the above-described embodiments, and those skilled in the art can change or add various configurations, mechanisms, or functions without departing from the scope of the present invention.

Further, in the present embodiment, although the magnetic sensor M2 is used, the present invention is not limited thereto. Other types of sensors such as an optical position sensor can be used as long as the position sensor can measure a position relation between the stem 53 and the pressing adapter 52 or a distance between predetermined locations of these members.

Further, even when any position sensor is used, it is desirable to select a position sensor whose position detection accuracy falls within a range of ±0.01 mm to ±0.001 mm. The reason is as follows. As a valve for the semiconductor manufacturing process, fine opening degree control of about ±0.01 mm is required to realize fine fluid control, but if detection accuracy exceeding ±0.001 mm is used, a vibration generated by a vacuum pump or the like in the vicinity of the valve V1 is detected and noise is generated.

Valve V2

A valve V2 according to another embodiment having a structure different from that of the valve V1 according to the present embodiment will be described with reference to FIGS. 13 to 18.

Figure 13:
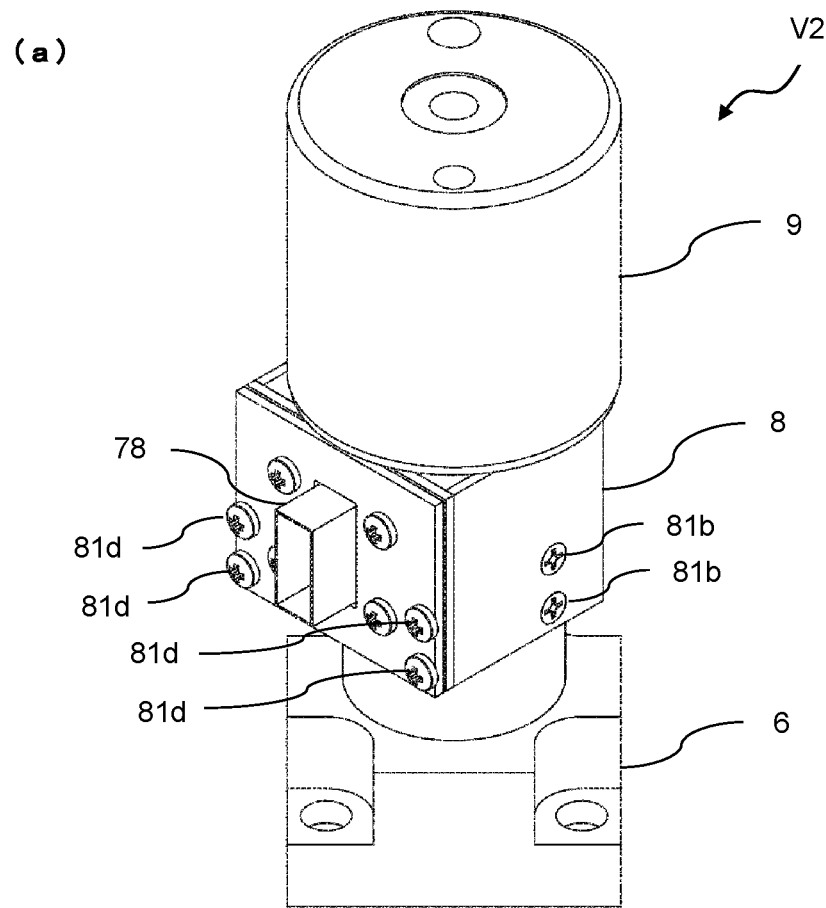
FIG. 13 is a diagram illustrating a valve according to another embodiment of the present invention, in which (a) is an external perspective view and (b) is a plan view.
Figure 13:
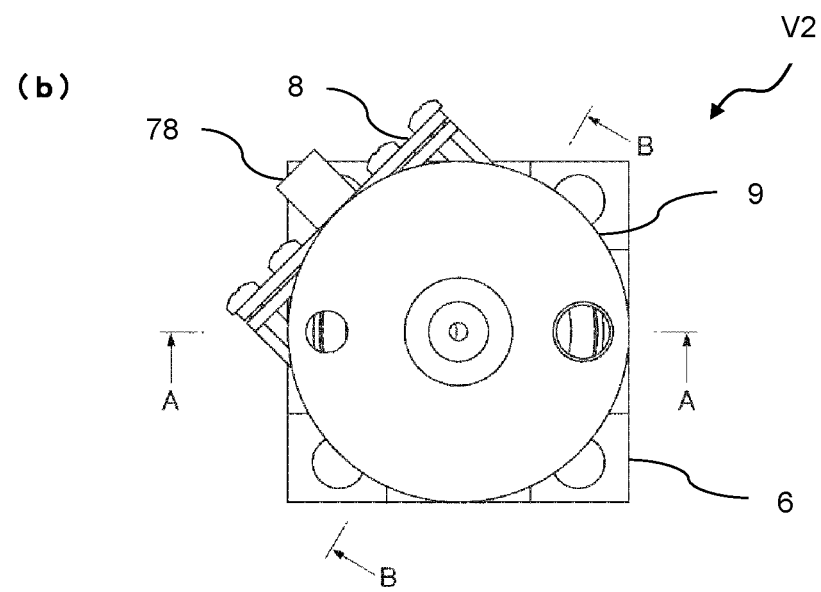
Figure 14:
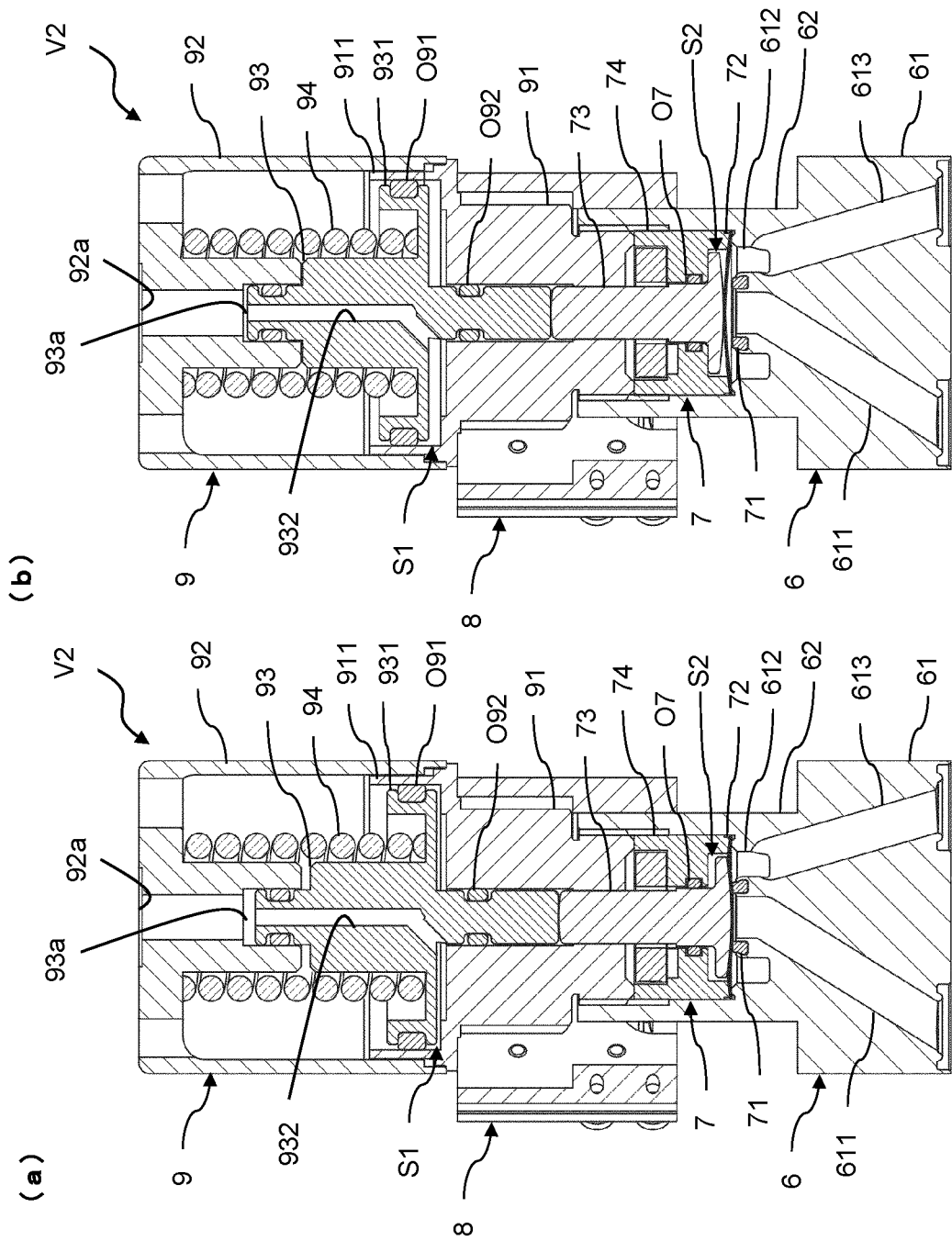
FIG. 14 is an A-A cross-sectional view illustrating an internal structure of a valve according to another embodiment of the present invention, in which (a) illustrates a valve closing state and (b) illustrates a valve opening state.
Figure 15:
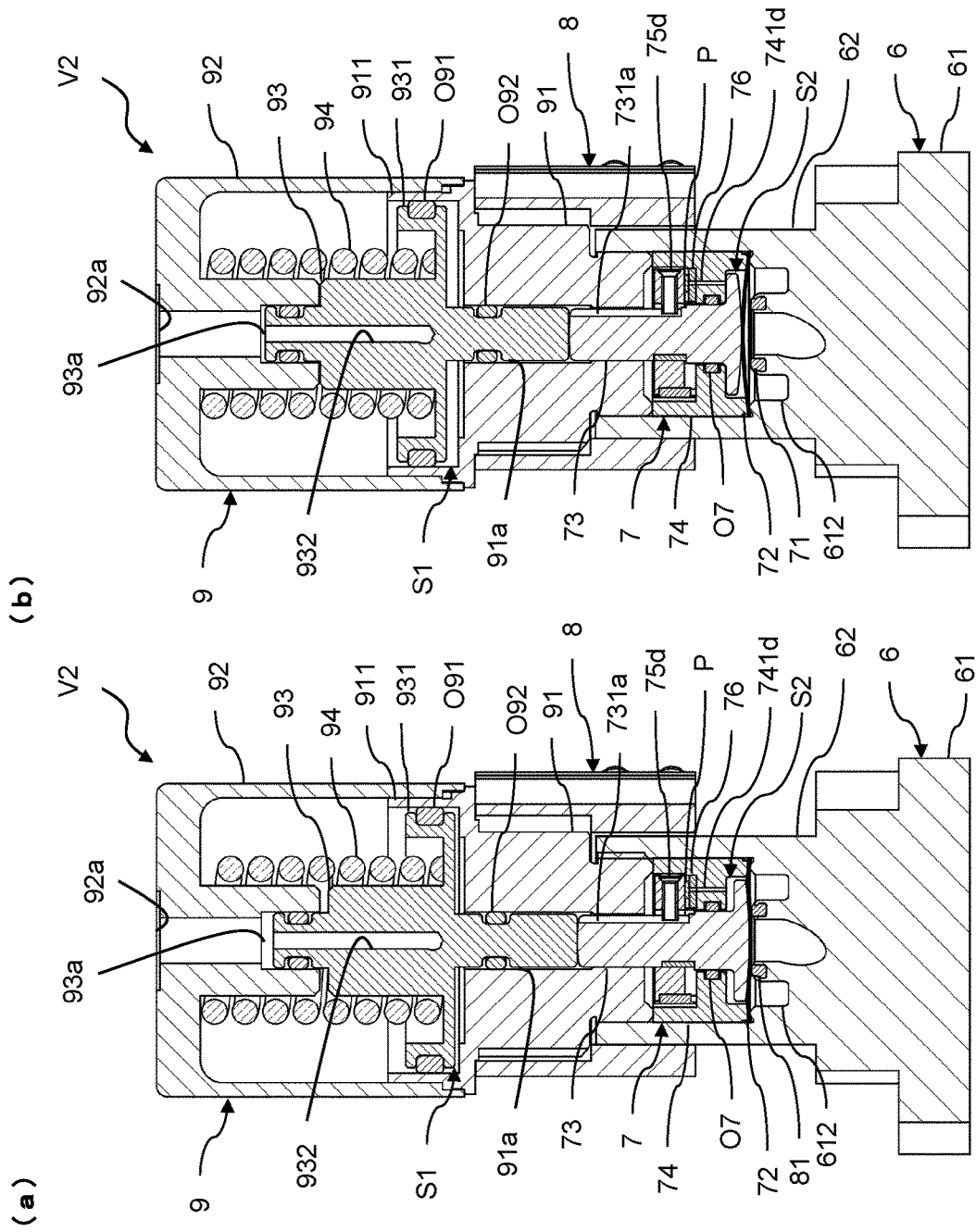
FIG. 15 is a B-B cross-sectional view illustrating an internal structure of a valve according to another embodiment of the present invention, in which (a) illustrates a valve closing state and (b) illustrates a valve opening state.
Figure 16:
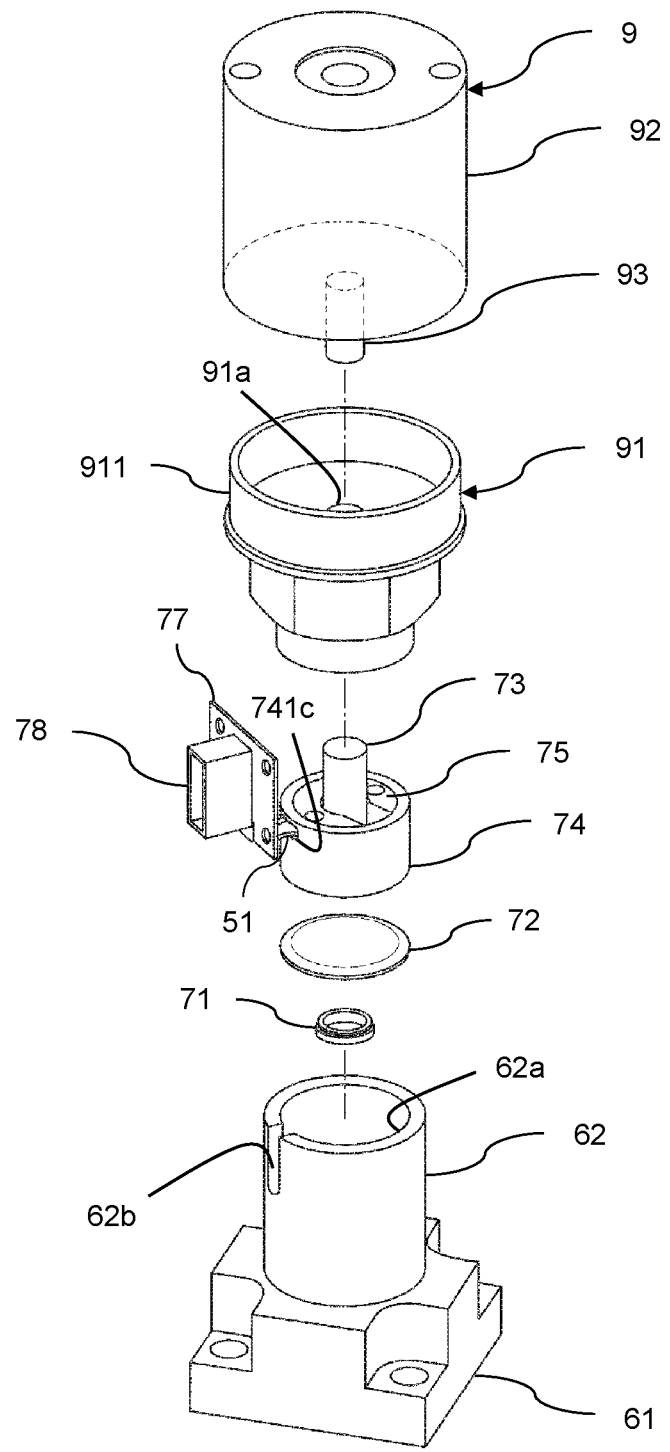
FIG. 16 is an exploded perspective view illustrating a valve according to another embodiment of the present invention.
Figure 17:
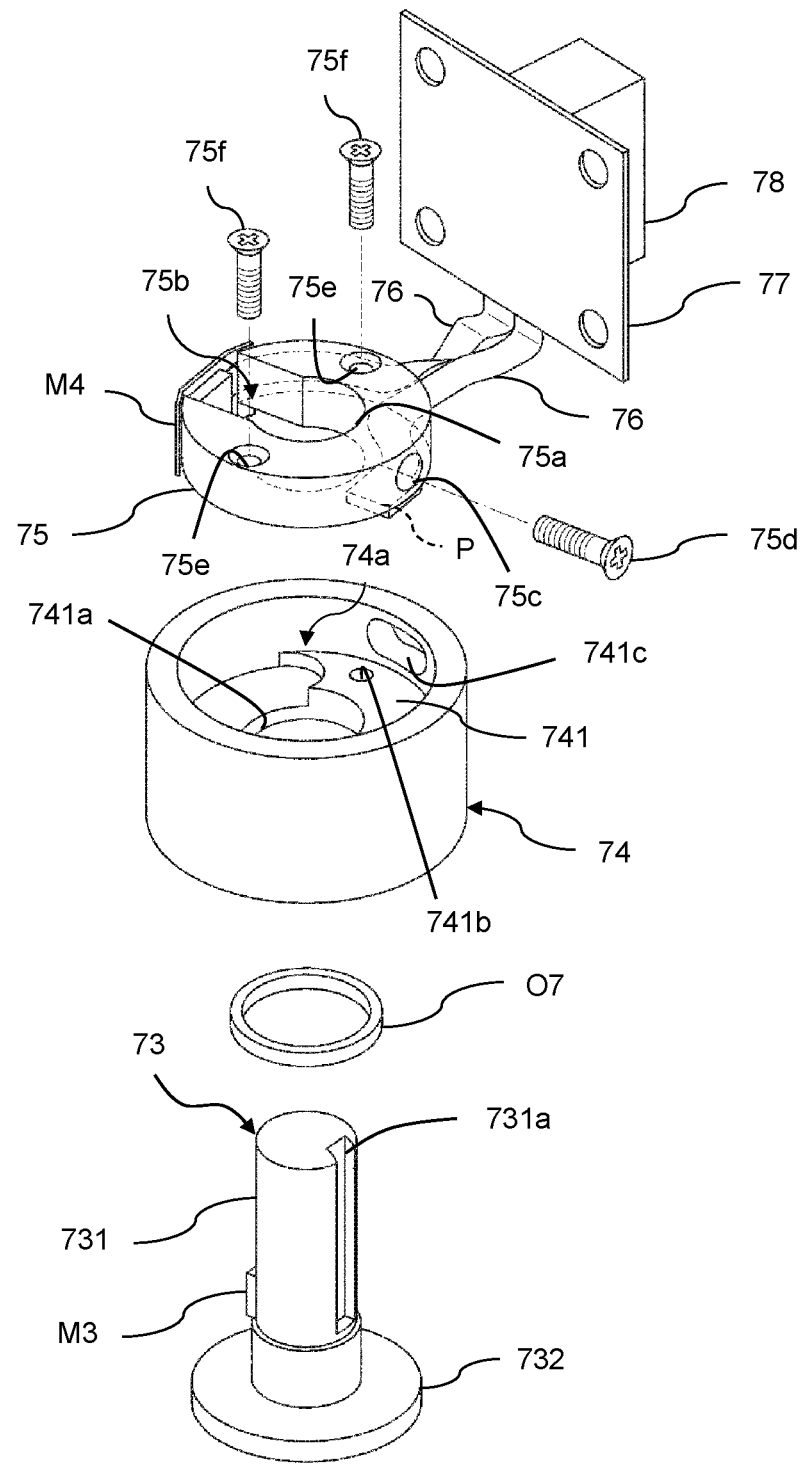
FIG. 17 is an exploded perspective view illustrating a valve according to another embodiment of the present invention.

The valve V2 illustrated in FIG. 13 is an air-operated direct diaphragm valve, and includes a valve body 6, a bonnet portion 7, a cover portion 8, and an actuator portion 9, as illustrated in FIGS. 14 to 16.

As illustrated in FIGS. 14 to 16, the valve body 6 includes a base portion 61 that is provided with a flow passage and a cylindrical portion 62 with a substantially cylindrical shape that is provided on the base portion 61.

The base portion 61 has a rectangular shape in plan view, and is a portion installed on a substrate or a manifold block when the above-described gas unit 1 (2) is configured by a plurality of valves V2.

The cylindrical portion 62 has a hollow shape with an opened end face on the side where the bonnet portion 7 is disposed, and a hollow interior configures a concave portion 62a in which the bonnet portion 7 is accommodated.

The cylindrical portion 62 is provided with a slit 62b that has a length in an axial direction, has an opening at one end on the side opposite to the base portion 61 to be the side where the bonnet portion 7 is disposed, and penetrates the cylindrical portion 62 from the outside to the side of the concave portion 62a. Through the slit 62b, a flexible cable 76 extending from a bonnet wall 75 is led from the inside to the outside.

Below the concave portion 62a and in the base portion 61, an inflow path 611 where the fluid flows in, an outflow path 613 where the fluid flows out, and a valve chamber 712 communicating with the inflow path 611 and the outflow path 613 are formed. The inflow path 611, the outflow path 613, and the valve chamber 712 integrally configure a flow passage through which the fluid circulates.

As illustrated in FIGS. 14 to 17, the bonnet portion 7 is disposed so as to be accommodated in the concave portion 62a of the valve body 6. The bonnet portion 7 includes a seat 71, a diaphragm 72, a diaphragm presser 73, a bonnet 74, and a bonnet wall 75.

The bonnet 74 in the present example is a member that presses a peripheral edge of the diaphragm 72 from the top surface side together with the bonnet wall 75 disposed in the bonnet 74, and is a member that corresponds to the pressing adapter 52 in the valve V1 described above. Further, in the present example, what is referred to as the diaphragm presser 73 has a function of pressing the diaphragm 72, similarly to the stem 53 in the valve V1.

The annular seat 71 is provided in a peripheral edge of an opening of the inflow path 611 in the valve chamber 712. By bringing the diaphragm 72 into and out of contact with the seat 71, the fluid can be circulated from the inflow path 611 to the outflow path 613, or the circulation can be blocked.

The diaphragm 72 is a spherical shell-shaped member that is made of a metal such as stainless steel or a Ni—Co alloy and has a center portion bulged in a convex shape, and it separates a flow passage from an operation space of the actuator portion 9. In a state where the diaphragm 72 is not pressed by the diaphragm presser 73, as illustrated in FIGS. 14(b) and 15(b), the diaphragm 72 is separated from the seat 71, and the inflow path 611 and the outflow path 613 communicate with each other. On the other hand, in a state where the diaphragm 72 is pressed by the diaphragm presser 73, as illustrated in FIGS. 14(a) and 15(a), the center portion of the diaphragm 72 deforms and comes into contact with the seat 71, and the inflow path 611 and the outflow path 613 are blocked.

The diaphragm presser 73 is provided above the diaphragm 72, and presses the center portion of the diaphragm 72 in conjunction with a vertical movement of a piston 93.

The diaphragm presser 73 includes a substantially columnar base portion 731 and a diameter expansion portion 732 having an expanded diameter at one end on the side that comes into contact with the diaphragm 72.

The base portion 731 is provided with a bottomed groove 731a that has a length in an axial direction and has an opening at one end on the side opposite to the diameter expansion portion 732. A shaft rod portion of a screw 75d screwed into a screw hole 75c of the bonnet wall 75 is slidably fitted into the groove 731a. The groove 731a and the screw 75d configure a rotation regulation mechanism for regulating the rotation of the diaphragm presser 73 in a circumferential direction. Thereby, the rotation of the diaphragm presser 73 in the circumferential direction is regulated while the diaphragm presser 73 moves vertically in conjunction with the piston 93.

Further, a magnet M3 is attached to the base portion 731. In the present embodiment, the magnet M3 is mounted on the side opposite to the groove 731a of the base portion 731. However, as long as there is no problem with a magnetic sensor M4 detecting the magnetic force of the magnet M3 and there is no problem with the operation of the valve V2, the magnet M3 can be mounted at another position on the base portion 731.

The bonnet 74 has a substantially cylindrical shape, and is accommodated in the concave portion 62a of the valve body 6.

The diaphragm 72 is sandwiched between a lower end of the bonnet 74 and the valve body 6, and a seal between the diaphragm 72 and the valve body 6 is formed at this portion.

The bonnet 74 is provided with a substantially disk-shaped partition portion 741 in which a through-hole 741a through which the diaphragm presser 73 is inserted is formed in a center portion.

The bonnet wall 75 is accommodated in the concave portion 74a formed above the partition portion 741 or on the side where the actuator portion 9 is provided. The partition portion 741 and the bonnet wall 75 are provided with screw holes 741b and through-holes 75e at positions corresponding to each other, and the bonnet wall 75 is screwed into the bonnet 74 with bolts 75f.

The partition portion 741 of the bonnet 74 has a certain thickness, and an O-ring O7 is interposed between an inner peripheral surface of the through-hole 741a formed in the partition portion 741 and the diaphragm presser 73. Thereby, airtightness of a closed space S2 defined by the partition portion 741, the diaphragm 72, and the diaphragm presser 73 is secured.

Further, the partition portion 741 of the bonnet 74 is provided with a communication hole 741d communicating with the pressure sensor P attached to the bonnet wall 75. The pressure sensor P is provided through the communication hole 741d, so that a pressure in the closed space S2 defined by the partition portion 741, the diaphragm 72, and the diaphragm presser can be measured.

Further, a side surface of the bonnet 74 is provided with a through-hole 741c for leading out the flexible cable 76 from the bonnet wall 75 accommodated inside.

The bonnet wall 75 is a member disposed in the bonnet 74. The bonnet wall 75 is formed by hollowing a substantially disk-shaped member having a large thickness into a substantially C-shape in plan view. At the center of the bonnet wall 75, a through-hole 75a through which the base portion 731 of the diaphragm presser 73 is inserted is provided. Further, an opening 75b that opens the through-hole 75a outward in a radial direction of the bonnet wall 75 is provided.

At a predetermined location in a thickness portion of the bonnet wall 75, the screw hole 75c threaded radially outward from the through-hole 75a is formed. The screw 75d is screwed into the screw hole 75c from the outside, and an axial center portion of the screwed screw 75d escapes to the side of the through-hole 75a and is slidably fitted into the groove 731a of the diaphragm presser 73 inserted into the through-hole 75a.

The bonnet wall 75 is provided with the through-hole 75e at a position corresponding to the screw hole 741b of the bonnet 74. The bolt 75f is screwed into the screw hole 741b and the through-hole 75e with the bonnet wall 75 disposed on the partition portion 741 of the bonnet 74, so that the bonnet wall 75 is fixed to the bonnet 74.

In the vicinity of the opening 75b in an outer peripheral surface of the bonnet wall 75, the magnetic sensor M4 with a flat plate shape, which is fixed so as to cover the opening 75b, is attached. The magnetic sensor M4 can measure not only an opening/closing state but also an opening degree of the valve V2 by sensing a change in the distance from the magnet M3 attached to the diaphragm presser 73. The magnetic sensor M4 attached to the bonnet wall 75 is fixed at a predetermined position without being affected by the vertical movement of the piston 93 or the diaphragm presser 73 caused by the opening/closing operation of the valve V2.

Figure 18:
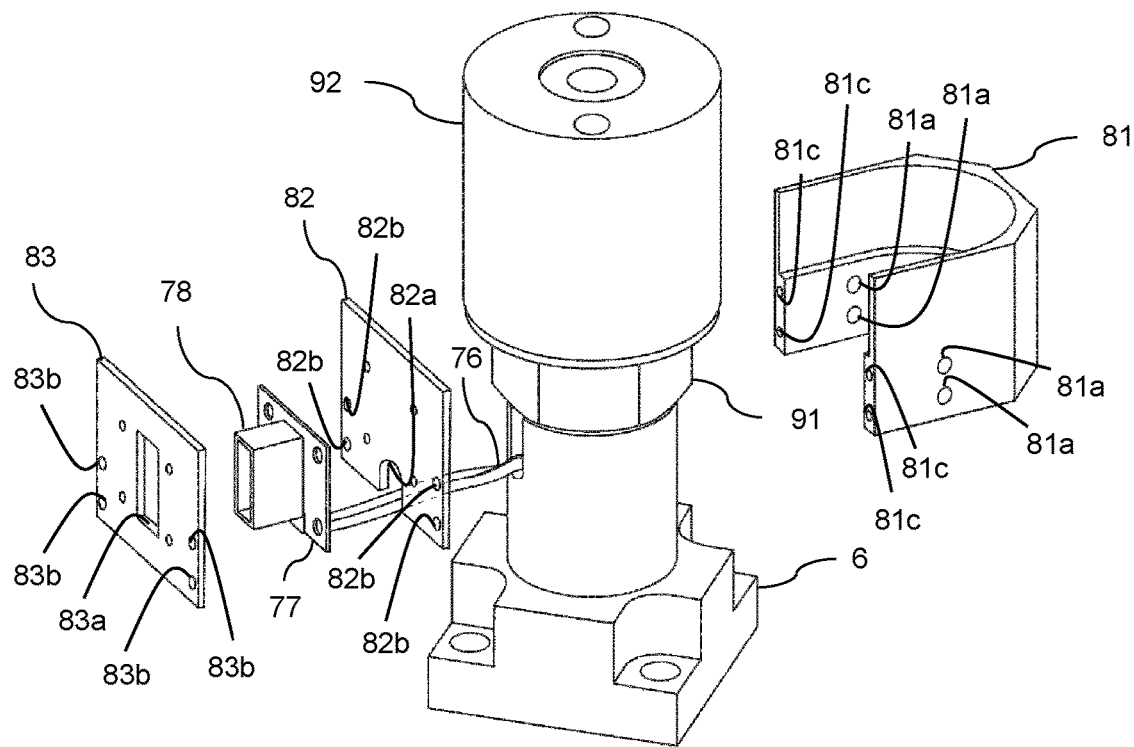
FIG. 18 is an exploded perspective view illustrating a valve according to another embodiment of the present invention.

As illustrated in FIGS. 13 and 18, the cover portion 8 configures a fixing mechanism for pressing the actuator body 91 and the valve body 6 to integrally hold them, and fixing a circuit board 77 and a connector 78 provided in the circuit board 77 to the valve V2.

The cover portion 8 includes a cover 81 and flat plates 82 and 83.

The cover 81 has a substantially U-shape, and ends of the actuator body 91 and the valve body 6 are fitted inside.

On both side surfaces of the cover 81, screw holes 81a are provided corresponding to positions where the actuator body 91 is fitted. Thereby, if the screws 81b are screwed into the screw holes 81a with the valve body 6 fitted inside and the tip of the screw 81b is pressed against the valve body 6, the valve body 6 can be held inside the cover 81.

Further, screw holes 81c are provided in a thickness portion of the cover 81. Screws 81d are screwed into the screw holes 81c via through-holes 82b and 83b of the plates 82 and 83, so that the plates 82 and 83 are attached to the cover 81.

The plates 82 and 83 are screwed and fixed to the cover 81 in a state where the ends of the actuator body 91 and the valve body 6 are fitted into the cover 81. In the fixed state, the actuator body 91 and the valve body 6 are held between the cover 81 and the plates 82 and 83.

A notch portion 82a cut in a tongue shape is formed on the lower side of the plate 82, and the flexible cable 76 is led to the circuit board 77 provided with the connector 78 via the notch portion 82a.

The plate 83 is screwed and fixed to the plate 82 and the cover 81 with the circuit board 77 interposed between the plate 83 and the plate 82, and the circuit board 77 is held between the plate 82 and the plate 83.

The plate 83 has a substantially rectangular through-hole 83a provided in a center portion, and the connector 78 provided in the circuit board 77 escapes from the through-hole 83a to the outside.

Here, when the base portion 61 is formed in a rectangular shape in plan view, as illustrated in FIG. 13(b), the cover portion 8 fixes the connector 78 to the valve V2 in a diagonal direction of the rectangular base portion 61. The reason why the connector 78 is fixed in the above direction is as follows. That is, when the gas unit 1 (2) is configured by a plurality of valves V2, due to the demand for integration, it is preferable to align the directions of the adjacent rectangular base portions 61 so as to eliminate gaps maximally, and to dispose the valves V2 on a base or a manifold block. On the other hand, when the valves are disposed and integrated as described above, it becomes difficult to connect terminals and the like to the connector 78. Therefore, by disposing the connector 78 in the diagonal direction of the base portion 61, a wider connection space can be taken as compared with when the connector 78 is disposed toward the valve V2 disposed right beside. As a result, the terminal or the like can be easily connected to the connector 78, so that it is possible to prevent problems such as disconnection due to breakage or twisting of the terminal or the like, and to prevent problems such as the terminal or the like hitting the valve V2 and causing an abnormality in the operation of the valve V2.

The actuator portion 9 is disposed on the bonnet portion 7.

The actuator portion 9 includes an actuator body 91, an actuator cap 92, a piston 93, and a spring 94, as illustrated in FIGS. 14 and 15. Although an internal structure of the actuator portion 9 is omitted in FIG. 16, the internal structure is as illustrated in FIGS. 14 and 15.

The actuator body 91 is interposed between the piston 93 and the bonnet 74.

As illustrated in FIG. 16, the actuator body 91 has a substantially columnar shape, and in a center portion thereof, a through-hole 91a through which the piston 93 and the diaphragm presser 73 are inserted is provided along a longitudinal direction. As illustrated in FIGS. 13 and 14, the piston 93 and the diaphragm presser 73 are in contact with each other in the through-hole 91a, and the diaphragm presser 73 moves vertically in conjunction with the vertical movement of the piston 93.

A peripheral wall 911 made of an annular ridge is formed on an upper end face on the side where the piston 93 is disposed, and a drive pressure introduction chamber S1 into which a drive pressure is introduced is formed between a flat horizontal surface inside the peripheral wall 911 and a lower end face of a diameter expansion portion 931 of the piston 93.

Further, a male screw is cut on an outer peripheral surface of the actuator body 91 on the side where the piston 93 is provided, and the male screw is screwed into a female screw cut on an inner peripheral surface of the actuator cap 92, so that the actuator body 91 is attached to one end of the actuator cap 92.

The center portion of the actuator body 91 in a longitudinal direction is formed in a substantially hexagonal shape in sectional view, and the hexagonal portion in sectional view and the upper end of the valve body 6 are integrally pressed by the cover 81.

The actuator cap 92 is a cap-shaped member whose lower end is open, and accommodates the piston 93 and the spring 94 inside.

An opening 92a communicating with a drive pressure introduction path 932 of the piston 93 is provided on an upper end face of the actuator cap 92.

The lower end of the actuator cap 92 is closed by screwing the upper portion of the actuator body 91.

The piston 93 moves up and down according to the supply and the stop of the drive pressure, and brings the diaphragm 72 into and out of contact with the seat 71 via the diaphragm presser 73.

The substantially center of the piston 93 in the axial direction is expanded in a disk shape, and the corresponding portion configures the diameter expansion portion 931. The piston 93 receives the biasing force of the spring 94 on the top surface side of the diameter expansion portion 931. Further, the drive pressure introduction chamber S1 to which the drive pressure is supplied is formed on the lower end side of the diameter expansion portion 931.

Further, the drive pressure introduction path 932 for causing the opening 93a formed on the upper end face and the drive pressure introduction chamber S1 formed on the lower end side of the diameter expansion portion 931 to communicate with each other is provided in the piston 93. The opening 93a of the piston 93 communicates with the opening 92a of the actuator cap 92, and an introduction pipe for introducing the drive pressure from the outside is connected to the opening 92a. As a result, the drive pressure is supplied to the drive pressure introduction chamber S1.

An O-ring O91 is attached to the outer peripheral surface of the diameter expansion portion 931 of the piston 93, and the O-ring O91 seals a portion between the outer peripheral surface of the diameter expansion portion 931 of the piston 93 and the peripheral wall 911 of the actuator body 91. Further, an O-ring O92 is attached to the lower end side of the piston 93, and the O-ring O92 seals a portion between the outer peripheral surface of the piston 93 and the inner peripheral surface of the through-hole 91a of the actuator body 91. The O-rings O91 and O92 form the drive pressure introduction chamber S1 communicating with the drive pressure introduction path 932 in the piston 93, and the airtightness of the drive pressure introduction chamber S1 is secured.

The spring 94 is wound on the outer peripheral surface of the piston 93, and comes into contact with the top surface of the diameter expansion portion 931 of the piston 93 to bias the piston 93 downward, that is, in a direction in which the diaphragm 72 is pressed.

Here, the opening/closing operation of the valve according to the supply and stop of the drive pressure will be described. If air is supplied from an introduction pipe (not illustrated) connected to the opening 92a, the air is introduced into the drive pressure introduction chamber S1 via the drive pressure introduction path 932 in the piston 93. In response to this, the piston 93 is pushed upward against the biasing force of the spring 94. As a result, the diaphragm 72 is separated from the seat 71 to be in an opened state, and the fluid circulates.

On the other hand, if the air is not introduced into the drive pressure introduction chamber S1, the piston 93 is pushed downward according to the biasing force of the spring 94. As a result, the diaphragm 72 comes into contact with the seat 71 to be a closed state, and the circulation of the fluid is blocked.

The valve V2 includes the pressure sensor P and the magnetic sensor M4 as an operation information acquisition mechanism for acquiring operation information in the device.

As illustrated in FIG. 15, the pressure sensor P is attached to the bottom surface of the bonnet wall 75 or the flow passage side, and communicates with the closed space S2 defined by the diaphragm 72, the partition portion 741 of the bonnet 74, and the diaphragm presser 73 via the communication hole 741d. The pressure sensor P includes a pressure-sensitive element that detects a change in the pressure, a conversion element that converts a detection value of the pressure detected by the pressure-sensitive element into an electric signal, and the like. Thereby, the pressure sensor P can detect the pressure in the closed space S2 defined by the diaphragm 72, the partition portion 741 of the bonnet 74, and the diaphragm presser 73.

A packing 26 is interposed at a location where the pressure sensor P communicates with the communication hole 741d, and an airtight state is secured.

The pressure sensor P may detect either the gauge pressure or the atmospheric pressure.

The magnetic sensor M4 can measure not only an opening/closing state but also an opening degree of the valve V2 by sensing a change in the distance from the magnet M3 attached to the diaphragm presser 73.

The opening/closing operation of the valve can be detected by the magnetic sensor M4 as described below. That is, while the magnet M3 moves vertically according to the vertical movement of the diaphragm presser 73, the magnetic sensor M4 is fixed in the valve body 6 together with the bonnet wall 75 and the bonnet 74. As a result, the operation of the diaphragm presser 73 and the opening/closing operation of the valve can be detected on the basis of a change in the magnetic field generated between the magnet M3 moving vertically according to the vertical movement of the diaphragm presser 73 and the magnetic sensor M4 whose position is fixed.

Various types of magnetic sensors can be used as the magnetic sensor M4. The magnetic sensor M4 according to an example has a planar coil, an oscillation circuit, and an integration circuit, and an oscillation frequency changes according to a change in the distance from the magnet M3 located at the facing position. In addition, by converting the frequency by the integration circuit and obtaining an integrated value, not only the opening/closing state of the valve V2 but also the opening degree at the time of opening the valve can be measured.

In the present embodiment, although the magnetic sensor M4 is used, the present invention is not limited thereto. Similarly to the above-described magnetic sensor M2, other types of sensors such as an optical position sensor can be used as long as the position sensor can measure a position relation between the diaphragm presser 73 and the bonnet 74 or a distance between predetermined locations of these members.

Even in the valve V2 according to the present embodiment, it is desirable to select a position sensor including the magnetic sensor M4 whose position detection accuracy falls within ±0.01 mm to ±0.001 mm. The reason is as follows. As a valve for the semiconductor manufacturing process, fine opening degree control of about ±0.01 mm is required to realize fine fluid control, but if detection accuracy exceeding ±0.001 mm is used, a vibration generated by a vacuum pump or the like in the vicinity of the valve is detected and noise is generated.

One end of the flexible cable 76 for communication is connected to each of the pressure sensor P and the magnetic sensor M4, and the other end of the flexible cable 76 is connected to the circuit board 77 provided outside the valve V2. In the present example, a processing module for transmitting and receiving information is configured in the circuit board 77. As a result, the operation information acquired from the pressure sensor P or the magnetic sensor M4 can be transmitted to an external terminal 6 connected to the connector 78.

In the valve V2, a flexible board (FPC) is used for the flexible cable 76 and the circuit board 77, and the flexible cable 76, the circuit board 77, and the connector 78 are integrally configured. By using the flexible board for the flexible cable 76 and the circuit board 77, it is possible to use a gap between members as a wiring path. As a result, the valve V2 itself can be downsized as compared with the case of using a covered wire.

Further, the processing module may be stored in the valve V2 separately from the circuit board 77, or may be configured as a part of the pressure sensor P or the magnetic sensor M4.

Further, the type or shape of the connector 78 can be appropriately designed according to various standards.

Further, the operation information acquisition mechanism realized by the pressure sensor P or the magnetic sensor M4 described above can also be realized by using a drive pressure sensor that detects the drive pressure, a temperature sensor that measures the temperature in the flow passage, a limit switch that detects the behavior of the piston 93 or the diaphragm presser 73, or the like.

In the valve V2 described above, the piston 93 and the diaphragm presser 73 are configured separately. However, the magnet M3 is attached to the diaphragm presser 73. Thereby, it is possible to determine an operation failure of the diaphragm presser 73. That is, normally, the diaphragm presser 73 follows the piston 93 and rises by the valve opening operation. However, when the valve is closed, the valve chamber 712 is depressurized to near the vacuum, so that the diaphragm 72 is attracted to the seat 71. As a result, even though the piston 93 rises, the diaphragm presser 73 may not follow the piston 93 and may remain in contact with the diaphragm 72. As a result, the diaphragm 72 may keep the flow passage blocked. However, even in this case, in the valve V2, the magnet M3 is interlocked with the diaphragm presser 73, so that the operation of the diaphragm presser 73 can be determined from the value detected by the magnetic sensor M4, and the operation failure can be determined.

The determination of the operation failure of the diaphragm presser 73 is enabled because the magnetic sensor M4 is attached to the diaphragm presser 73 which does not move vertically like the piston 93 and the diaphragm presser 73 according to the opening and closing operation of the valve V2, so that a relative operation of the diaphragm presser 73 can be identified. Therefore, a member to which the magnetic sensor M4 is to be attached may be fixed at a predetermined position regardless of the opening/closing operation of the valve V2 in that the operation of the diaphragm presser 73 can identified and the operation failure can be determined.

As a specific abnormality determination method, the abnormality determination unit determines whether or not a change in the distance between the magnet M3 and the magnetic sensor M4 corresponding to the valve opening operation is matched with a change in the distance at the time of normality, from the detection value of the magnetic sensor M4. If they are matched, it is determined that there is no abnormality, and if they are not matched, it is determined that there is an abnormality. In particular, when there is no change in the distance, it is understood that the diaphragm presser 73 keeps pressing the diaphragm 72.

As described above, in the valve V2, even if the piston 93 and the diaphragm presser 73 are configured separately, it is possible to determine the operation failure of the diaphragm presser 73.

REFERENCE SIGNS LIST

| | |
|---|---|
| 1, 2 | Gas unit |
| 10, 10a, 10b, 10c | Main cable |
| 101, 102 | Branch cable |
| 11, 12, 13 | Extension cable |
| 111, 112, 113, 114 | Sub-cable |
| 121, 122, 123, 124 | Sub-cable |
| 131, 132, 133, 134 | Sub-cable |
| 20, 20a, 20b, 20c | Main tube |
| 21, 22, 23 | Extension tube |
| 211, 212, 213 | Extension tube |
| 214, 215, 216, 217, 218 | Sub-tube |
| 221, 222, 223 | Extension tube |
| 224, 225, 226, 227, 228 | Sub-tube |
| 231, 232, 233 | Extension tube |
| 234, 235, 236, 237, 238 | Sub-tube |
| 3 | Valve body |
| 3a | Drive pressure introduction port |
| 4 | Drive pressure control device |
| 40 | Casing |
| 411, 412 | Automatic valve |
| 421, 422 | Valve drive unit |
| 431, 432, 433 | Drive pressure introduction path |
| 44 | Exhaust passage |
| 45 | Wiring |
| 51 | Diaphragm |
| 52 | Pressing adapter |
| 53 | Stem |
| 6 | Valve body |
| 61 | Base portion |
| 62 | Cylindrical portion |
| 7 | Bonnet portion |
| 71 | Seat |
| 72 | Diaphragm |
| 73 | Diaphragm presser |
| 74 | Bonnet |
| 75 | Bonnet wall |
| 76 | Flexible cable |
| 77 | Circuit board |
| 78 | Connector |
| 8 | Cover portion |
| 81 | Cover |
| 82 | Plate |
| 83 | Plate |
| 9 | Actuator portion |
| 91 | Actuator body |
| 92 | Actuator cap |
| 93 | Piston |
| 94 | Spring |
| L1, L2, L3 | Fluid supply line |
| C1, C2, C3 | Branch connector |
| F(F1, F2, F3) | Flow rate control device |
| J1 | Branch joint |
| J11, J111, J112, J113 | Joint |
| J12, J121, J122, J123 | Joint |
| J13, J131, J132, J133 | Joint |
| M1, M3 | Magnet |
| M2, M4 | Magnetic sensor |
| V1(V11 to V14, V21 to 24, V31 to 34), V2 | Valve |
| P | Pressure sensor |
| S1 | Drive pressure introduction chamber |
| S2 | Closed space |

The invention claimed is:

1. A valve configured for detecting an operation abnormality, comprising:
a diaphragm depressor configured to press a center portion of a diaphragm in conjunction with an operation of an actuator;
a pressing adapter configured to press a peripheral edge of the diaphragm;
a magnetic sensor attached to the pressing adapter and configured to detect a change in a distance between a magnet placed on the diaphragm depressor and the magnetic sensor;
an abnormality determination mechanism configured to compare a change in the distance between the magnet and the magnetic sensor at the time of abnormality diagnosis detected by the magnetic sensor and a previously measured change in the distance between the magnet and the magnetic sensor at the time of normality, and to determine, based on a result of the compare of the change to the previously determined change, whether or not there is an abnormality; and
a rotation regulation mechanism that is configured to regulate the diaphragm depressor to rotate in the circumferential direction.

2. The valve according to claim 1, wherein the rotation regulation mechanism comprises:
a groove formed in the axial direction of the diaphragm depressor, and
a shaft rod slidably fitted into the groove.

3. An abnormality diagnosis method of a valve,
wherein the valve includes
a diaphragm depressor configured to press a center portion of a diaphragm in conjunction with an operation of an actuator,
a pressing adapter configured to press a peripheral edge of the diaphragm,
a magnetic sensor attached to the pressing adapter and configured to detect a change in distance between a magnet placed on the diaphragm depressor and the magnetic sensor, and
a rotation regulation mechanism that is configured to regulate the diaphragm depressor to rotate in the circumferential direction,
the abnormality diagnosing method comprising:
a step comparing a change in the distance between the magnet and the magnetic sensor at the time of abnormality diagnosis detected by the magnetic sensor and a previously measured change in the distance between the magnet and the magnetic sensor at the time of normality, and determining whether or not there is an abnormality.

* * * * *